United States Patent
Willis

(10) Patent No.: US 7,506,405 B2
(45) Date of Patent: Mar. 24, 2009

(54) QUAD-CASTER CARRIAGE WITH FORKLIFT ATTACHMENT

(75) Inventor: Douglas G. Willis, Colby, KS (US)

(73) Assignee: Martin Mobile Company, LLC, Colby, KS (US)

(*) Notice: Subject to any disclaimer, the term of this patent is extended or adjusted under 35 U.S.C. 154(b) by 368 days.

(21) Appl. No.: 11/277,546

(22) Filed: Mar. 27, 2006

(65) Prior Publication Data

US 2006/0196007 A1 Sep. 7, 2006

Related U.S. Application Data

(63) Continuation-in-part of application No. 10/886,369, filed on Jul. 6, 2004, now Pat. No. 7,146,683.

(51) Int. Cl.
*B60B 33/00* (2006.01)

(52) U.S. Cl. ........................................ 16/47; 280/79.11

(58) Field of Classification Search ............... 16/47, 16/48, 18 R, 31 R, 31 A; 280/79.2, 79.11
See application file for complete search history.

(56) References Cited

U.S. PATENT DOCUMENTS

| | | | |
|---|---|---|---|
| 301,925 A | 7/1884 | Roux | |
| 344,988 A | 7/1886 | Richmond | |
| 411,181 A | * 9/1889 | Barron | 16/47 |
| 623,157 A | 4/1899 | Hunter | |
| 1,160,690 A | * 11/1915 | Choate | 16/47 |
| 1,622,447 A | 3/1927 | Kalberer | |
| 1,666,139 A | 4/1928 | Johnson | |
| 2,123,707 A | 7/1938 | Bloch | |
| 2,472,952 A | * 6/1949 | Lennard | 280/79.11 |
| 2,537,554 A | * 1/1951 | Seely | 280/79.11 |
| 2,627,425 A | * 2/1953 | McNamara | 280/79.11 |
| 2,713,179 A | * 7/1955 | Clifton | 16/47 |
| 2,857,728 A | 10/1958 | Baggs et al. | |
| 3,433,500 A | 3/1969 | Christensen | |
| 3,527,470 A | * 9/1970 | Ord | 280/79.2 |
| 3,663,044 A | 5/1972 | Contreras et al. | |
| 3,951,370 A | * 4/1976 | Tompkins | 16/18 R |

(Continued)

FOREIGN PATENT DOCUMENTS

GB 4822 12/1877

OTHER PUBLICATIONS

Declaration of Inventor, Douglas A. Willis, attesting to pre-filing date activities (Dated Oct. 31, 2005).

(Continued)

*Primary Examiner*—Victor Batson
*Assistant Examiner*—Jeffrey O'Brien
(74) *Attorney, Agent, or Firm*—Hovey Williams LLP

(57) ABSTRACT

A carriage including an articulated caster is disclosed. The carriage supports a load and includes a frame with a load-supporting section, base sections, and a linkage that permits relative pivotal movement therebetween. The linkage includes a transverse section that pivotally interconnects at least two of the base sections and a longitudinal section that pivotally interconnects the transverse section and the load-supporting section. The linkage permits relative pivotal movement so that at least two of the carriages may cooperatively support the load and substantially share the load over an uneven surface.

35 Claims, 20 Drawing Sheets

U.S. PATENT DOCUMENTS

| | | | |
|---|---|---|---|
| 4,053,129 A | 10/1977 | Graff | |
| 4,494,272 A | 1/1985 | Morita | |
| 4,801,152 A * | 1/1989 | Elliott et al. | 280/79.11 |
| 4,929,136 A | 5/1990 | Mee | |
| 5,088,799 A | 2/1992 | Redmon et al. | |
| 5,115,608 A * | 5/1992 | Abraham et al. | 52/238.1 |
| 5,348,326 A | 9/1994 | Fullenkamp et al. | |
| 5,507,069 A | 4/1996 | Willis | |
| 6,212,863 B1 | 4/2001 | Thomas | |
| 6,328,318 B1 | 12/2001 | Hsu | |
| 6,405,393 B2 * | 6/2002 | Megown | 280/35 |
| 6,550,101 B2 | 4/2003 | Plate | |
| 6,609,690 B1 | 8/2003 | Davis | |
| 6,726,524 B2 | 4/2004 | Yamaguchi et al. | |
| 6,880,202 B2 | 4/2005 | Thompson et al. | |
| 6,902,449 B1 | 6/2005 | Faucheux et al. | |
| 7,017,228 B2 * | 3/2006 | Silverstein et al. | 16/18 R |
| 7,146,683 B1 * | 12/2006 | Willis | 16/47 |
| 7,404,566 B2 * | 7/2008 | Ruiz | 16/18 R |
| 2005/0212243 A1 * | 9/2005 | Terry | 280/79.11 |
| 2006/0196006 A1 | 9/2006 | Willis | |
| 2006/0196007 A1 | 9/2006 | Willis | |
| 2006/0288523 A1 | 12/2006 | Willis | |
| 2007/0039786 A1 | 2/2007 | Willis | |
| 2007/0220704 A1 * | 9/2007 | Willis | 16/47 |

OTHER PUBLICATIONS

Declaration of Attorney of Record, Andrew G. Colombo, attesting to pre-filing activities and disclosures made to third parties (Dated Sep. 15, 2008).

Office Action from U.S. Appl. No. 11/458,894; Examiner: David C. Reese (Dated Dec. 26, 2007).

Office Action from U.S. Appl. No. 11/277,557; Examiner: Matthew J. Sullivan (Dated Aug. 7, 2008).

Office Action from U.S. Appl. No. 11/277,538; Examiner: Matthew J. Sullivan (Dated Aug. 25, 2008).

* cited by examiner

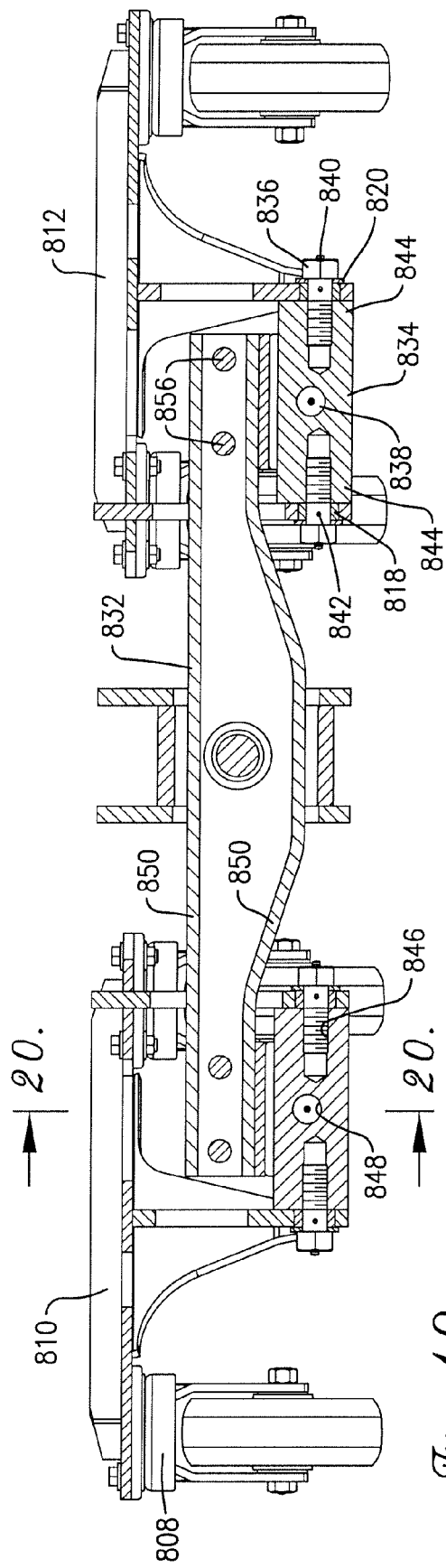
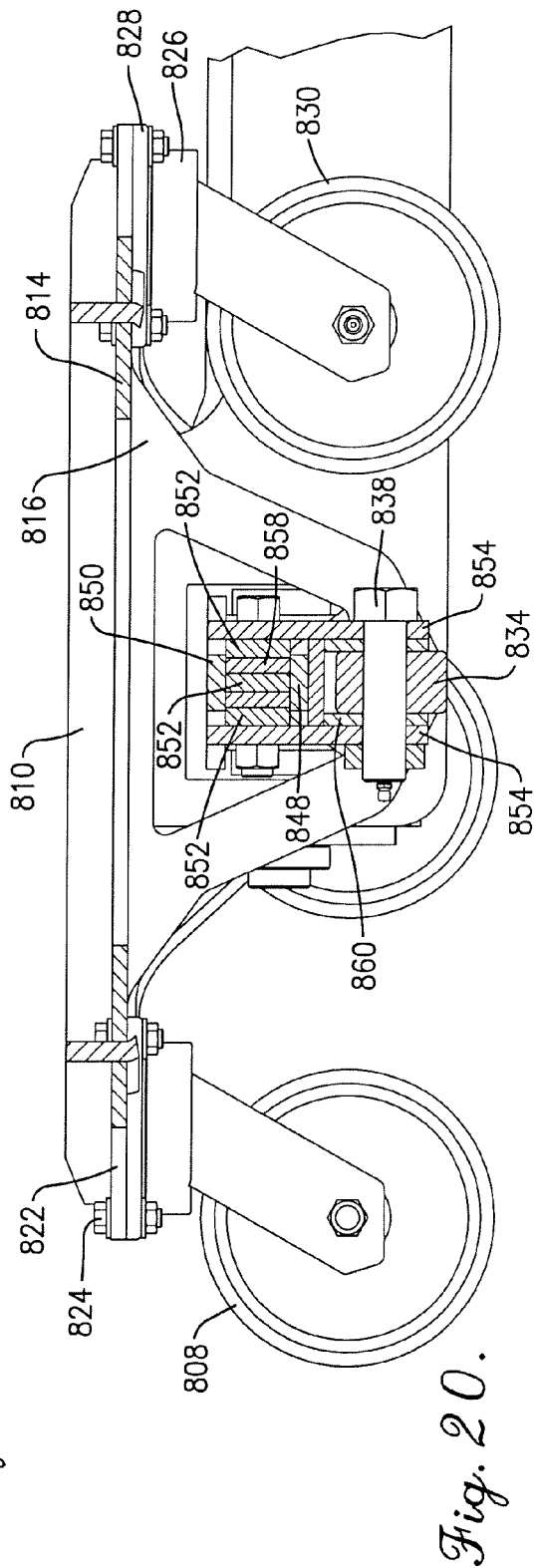
Fig. 19.
Fig. 20.

QUAD-CASTER CARRIAGE WITH FORKLIFT ATTACHMENT

RELATED APPLICATION

This application is a continuation-in-part of U.S. patent application Ser. No. 10/886,369, filed Jul. 6, 2004 now U.S. Pat. No. 7,146,683, entitled ARTICULATED CASTER, which is hereby incorporated by reference herein.

BACKGROUND OF THE INVENTION

1. Field of the Invention

The present invention relates generally to casters and wheeled load-supporting carts. More specifically, the present invention concerns a cart or carriage that includes multiple-wheeled casters.

2. Discussion of Prior Art

Carts with one or more single-wheel casters are known in the art and are employed in a wide variety of applications including personal, retail, and industrial applications. Carts employing one or more multiple-wheel frames for supporting loads, especially very heavy loads, are also known in the art.

Prior art carts with casters and multiple-wheel load-supporting mechanisms are problematic and suffer from certain limitations. For example, prior art carts are ineffective for supporting a load in that a plurality of such carts, when used to support the load, do not effectively share the load. This limitation is particularly acute when a plurality of prior art carts are used to support the load over an uneven surface and the carts must conform to the surface while supporting the load. Another problem with prior art carts is that they are not effective for use with loads that are moveable by forklifts. In particular the prior art carts do not do not accommodate forklift tubes and do not provide a convenient and releasable attachment mechanism between the cart and the forklift tube to prevent relative movement therebetween. Accordingly, there is a need for an improved caster that does not suffer from these problems and limitations.

SUMMARY OF THE INVENTION

A first aspect of the present invention concerns a pair of carriages operable to cooperatively support a rigid load for movement across a surface, wherein the carriages are spaced apart and the load extends therebetween in a spaced direction. Each of the carriages broadly include at least two caster assemblies, a load-supporting section, and a linkage. Each of the caster assemblies includes a base section and at least three rotatable caster wheels attached to the base section so that the caster assembly is self-supporting. The load-supporting section is operable to support the load thereon. The linkage interconnects the caster assemblies, with a base pivot axis being provided between the linkage and each of the caster assemblies to provide relative pivotal movement therebetween. The linkage is pivotally connected to the load-supporting section about an intermediate pivot axis. The load-supporting sections of the carriages have a positional relationship which is maintained substantially constant as the carriages move across the surface.

A second aspect of the present invention concerns a carriage operable to support a load for movement across a surface. The carriage broadly includes a plurality of caster assemblies, a load-supporting section, and a linkage. Each of the plurality of caster assemblies includes a base section and at least three rotatable caster wheels attached to the base section so that the caster assembly is self-supporting. The load-supporting section is operable to support the load thereon. The linkage interconnects the caster assemblies and load-supporting section. The linkage includes a longitudinal section and at least a pair of transverse sections. Each of the transverse sections extends in opposite directions from the longitudinal section to present a pair of opposed outrigger arms, with the transverse section being pivotally coupled to the longitudinal section between the arms for pivotal movement about a longitudinal axis. Each of the caster assemblies is pivotally coupled to a corresponding one of the outrigger arms at a universal joint which provides for relative pivotal movement about at least two base pivot axes.

A third aspect of the present invention concerns a carriage operable to support a load for movement across a surface, wherein the load is supported at least in part by a forklift tube, which is provided with a connection tab having an aperture defined therein. The carriage broadly includes a caster assembly, a load-supporting section, and a pin. The caster assembly includes a base section and at least three rotatable caster wheels attached to the base section so that the caster assembly is self-supporting. The load-supporting section is operable to support the load thereon. The load-supporting section includes a tube-supporting shelf operable to support the tube thereon. The shelf presents a hole dimensioned and configured to align with the aperture when the tube is supported on the shelf. The pin is configured to be removably received in the aperture and hole when the tube is supported on the shelf so as to releasably secure the load-supporting section to the tube.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 19 is a greatly enlarged cross-sectional view of the carriage taken along line 19-19 in FIG. 16;

FIG. 20 is a greatly enlarged cross-sectional view of the carriage taken along line 20-20 in FIG. 19;

Figure 1:
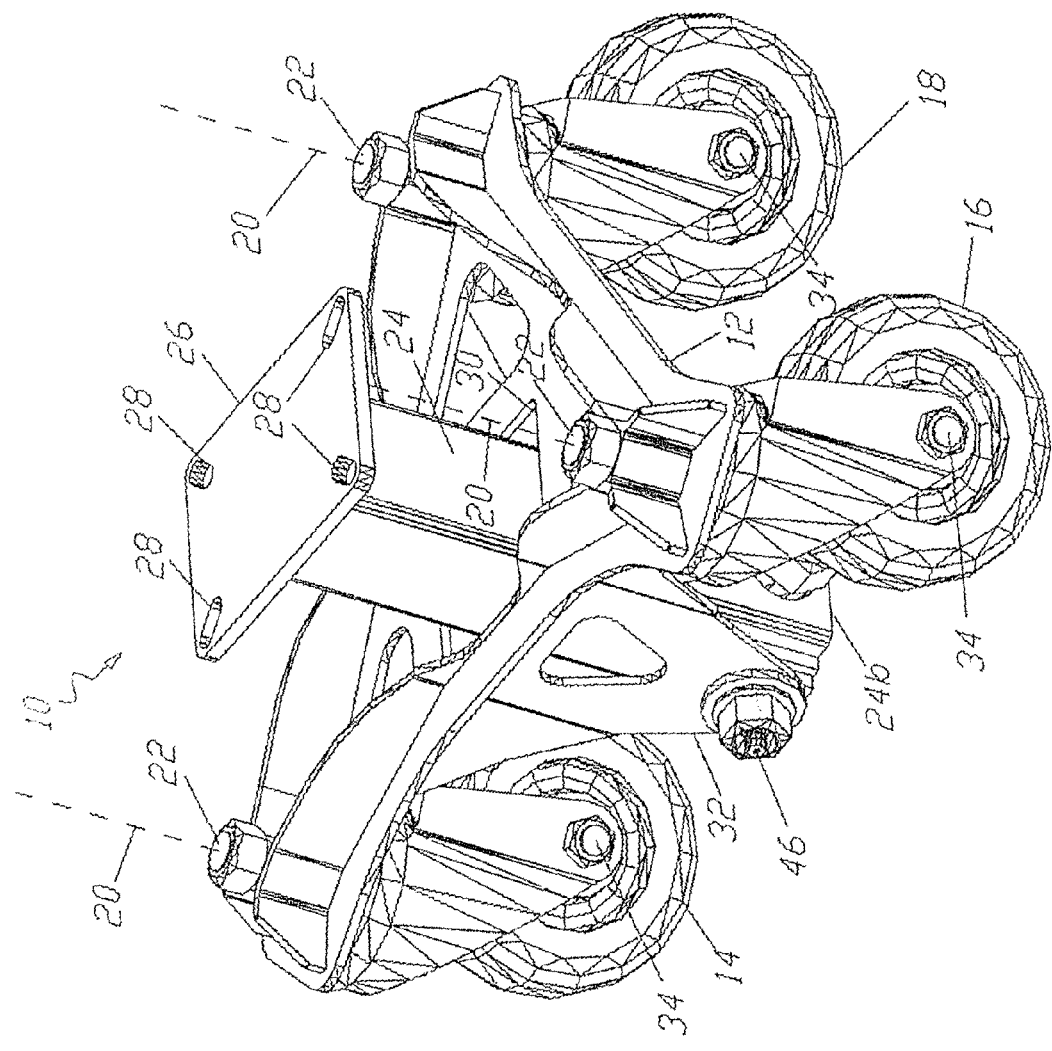
FIG. 1 is a fragmentary upper perspective view of an articulated caster constructed in accordance with a preferred embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The figures illustrate various embodiments of a carriage constructed in accordance with a preferred embodiment of the present invention. The disclosed carriage embodiments provide a stable platform for supporting relatively large loads with small caster wheels on an irregular surface. The disclosed embodiments also permit the load to be moved over that surface by the application of relatively small lateral forces. While the illustrated embodiments are primarily intended for industrial load supporting applications, the principles of the present invention are equally applicable in other personal or consumer applications (e.g., computer, instrumentation, and medical applications). Such applications may involve mobile load-carrying devices such as carts, trailers, or hand trucks.

Figure 2:
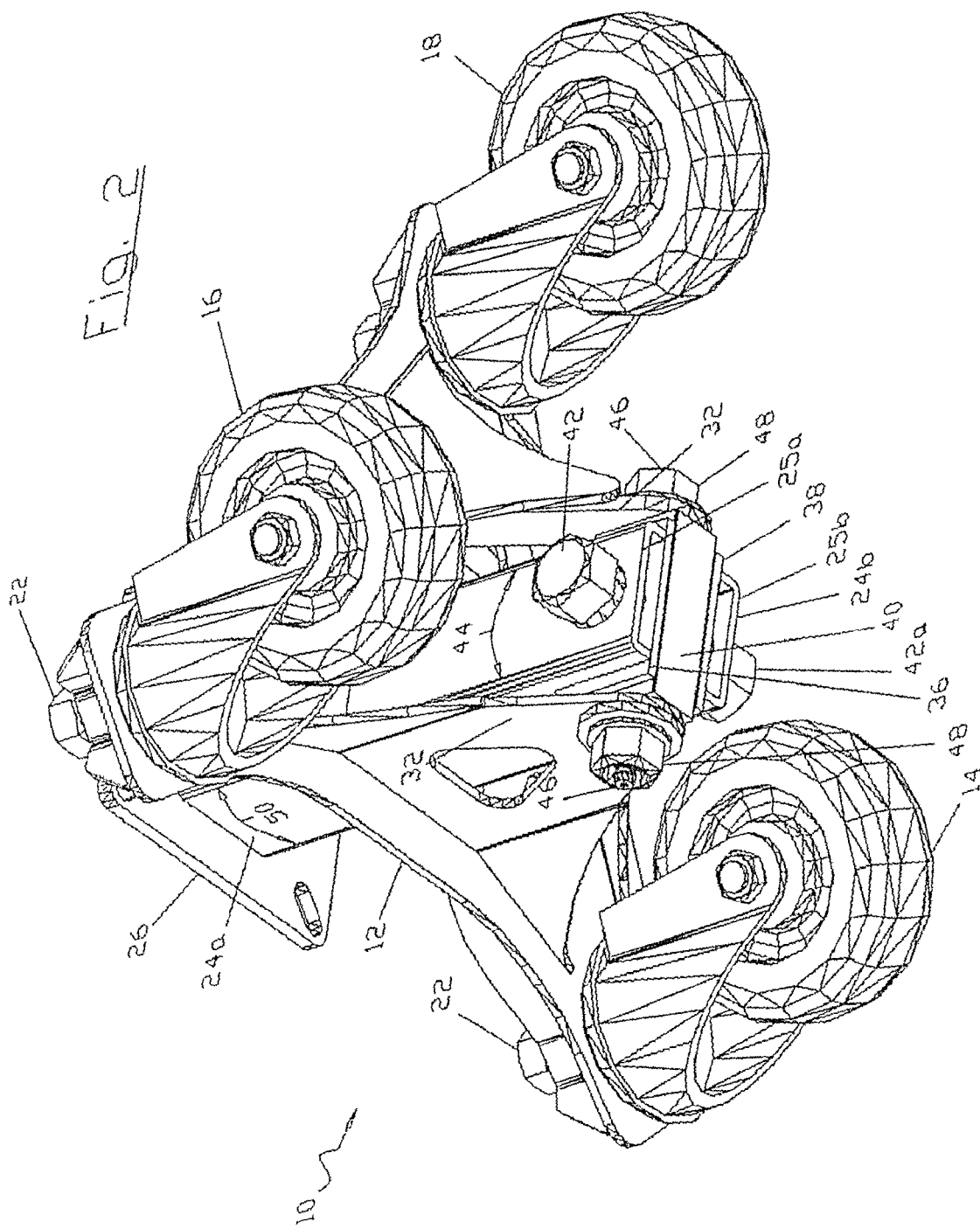
FIG. 2 is a fragmentary lower perspective view of the articulated caster shown in FIG. 1.

Referring to FIG. 1 and FIG. 2, an articulated caster is shown, identified in general by the reference numeral 10.

A base assembly 12 preferably includes a lead wheel 14 and two trailing wheels 16, 18. All wheels 14-18 preferably rotate about a vertical axis 20 that passes through a mounting bolt 22 of each wheel 14-20.

The two trailing wheels 16, 18 are preferably also staggered so that they are not parallel. This helps smooth movement when a surface irregularity is encountered.

A pivot arm 24 includes an upper end 24a and an opposite lower end 24b. The upper end 24a is attached to a flange plate 26. The flange plate includes bolt holes 28 and is used to attach the caster 10 to an object (not shown) that is to be supported by the caster 10.

The pivot arm 24 passes through a correspondingly shaped opening 30 in the base assembly 12. The base assembly 12 includes a pair of side members 32 that extend down on opposite sides of the opening 30 to a location that is, preferably, lower than that of an axle 34 of each of the wheels 14-18. The side members 32 are securely attached to the base assembly 12.

All load (i.e., the weight of the object) that is applied to each caster 10 is transferred through the pivot arm 24 to a lower end of both of the side members 32. This is described in greater detail hereinafter.

However, it is important to note that by transferring the load to a location within the caster 10 that is proximate or below the axles 34, as the object is moved laterally (along the surface), there is no force applied to the caster 10 above the axles 34. This provides a low effective center of gravity for the caster 10 as it supports the weight of the object, thereby making the caster 10 especially stable.

Referring now primarily to FIG. 2, the lower end 24b of the pivot arm 24 includes a first side 25a and an opposite second side 25b. A rectangular opening is provided in the lower end 24b, of the pivot arm 24 intermediate the first side 25a and the second side 25b. The rectangular opening is open at the lower end 24b, and it extends up along the longitudinal length of the pivot arm 24 for a predetermined distance.

A first side plate 36 is attached to the first side 25a, and a second side plate 38 is attached to the second side 25b. Attachment, as used anywhere herein, is by any preferred method. It can include welding, molding together as a unit, bolts and nuts, or any other method.

A pivot block 40 is inserted in the space between the first and second side plates 36, 38. The pivot block 40 can move in the space, as is described hereinbelow, yet the fit between the pivot block 40 and the side plates 36, 38 includes minimal tolerance and, therefore, minimal slack.

A first bolt 42 passes through an opening in the first side 25a, through a coincident opening in the first side plate 36, through a coincident opening through the pivot block 40, through a coincident opening in the second side plate 38, and through a coincident opening in the second side 25b. The first bolt 42 is secured in place, preferably by a lock nut 42a or other locking means.

The pivot arm 24 is adapted to pivot from side to side, as shown by arrow 44, with respect to the pivot block 40. This defines a first axis of pivoting for the pivot arm 24 with respect to the base assembly 12 (i.e., through a longitudinal axis of the first bolt 42). Obviously, the pivot arm 24 cannot pivot more than the space intermediate the pivot arm 24 and the opening 30 in the base assembly 12 allows.

The pivot block 40 includes a pair of threaded extensions (not shown) that extend from the center of the pivot block 40 and which pass through two openings provided on opposite sides of the side members 32 as low as possible. A grease fitting 46 is preferably attached to each threaded extension wherein each threaded extension includes an opening that is adapted to convey grease into the pivot block 40. If preferred, only one grease fitting 46 may be used.

A pair of lock nuts 48 cooperate with threads on the threaded extensions and are used to secure the pivot block 40 to the side members 32. The pivot block 40, therefore, acts as a second bolt to secure the pivot arm 24 to the base assembly 12 and as one which includes a longitudinal axis that is always perpendicular with respect to the first bolt 42.

Another embodiment, also preferable, is to include the grease fitting 46 in a hollow bolt (in this alternate embodiment, also as shown, the hollow bolt is identified by reference number 48), which, accordingly, shows the head of the hollow bolt 48 and where the hollow bolt 48 screws into threads that are provided in an end of the pivot block 40.

The pivot block 40 is adapted to pivot from side to side, as shown by arrow 50, with respect to the side members 32, and within the limits as afforded by the opening 30. This defines a second axis of pivoting for the pivot arm 24 (i.e., around the longitudinal center of the pivot block 40) with respect to the base assembly 12.

Accordingly, the caster 10 is adapted to pivot about two axes that are perpendicular to each other with respect to the base assembly 12. It is possible to use angles other than perpendicular for special purposes. The longitudinal axis of the first bolt 42 is in line with the normal direction (i.e., line) of travel. The longitudinal axis of the pivot block 40 (the second bolt) is preferably disposed at a 90 degree angle with respect to the normal direction of anticipated movement by the caster 10. This allows the wheels 14-18 of the caster to overcome surface irregularities with ease.

Figure 3:
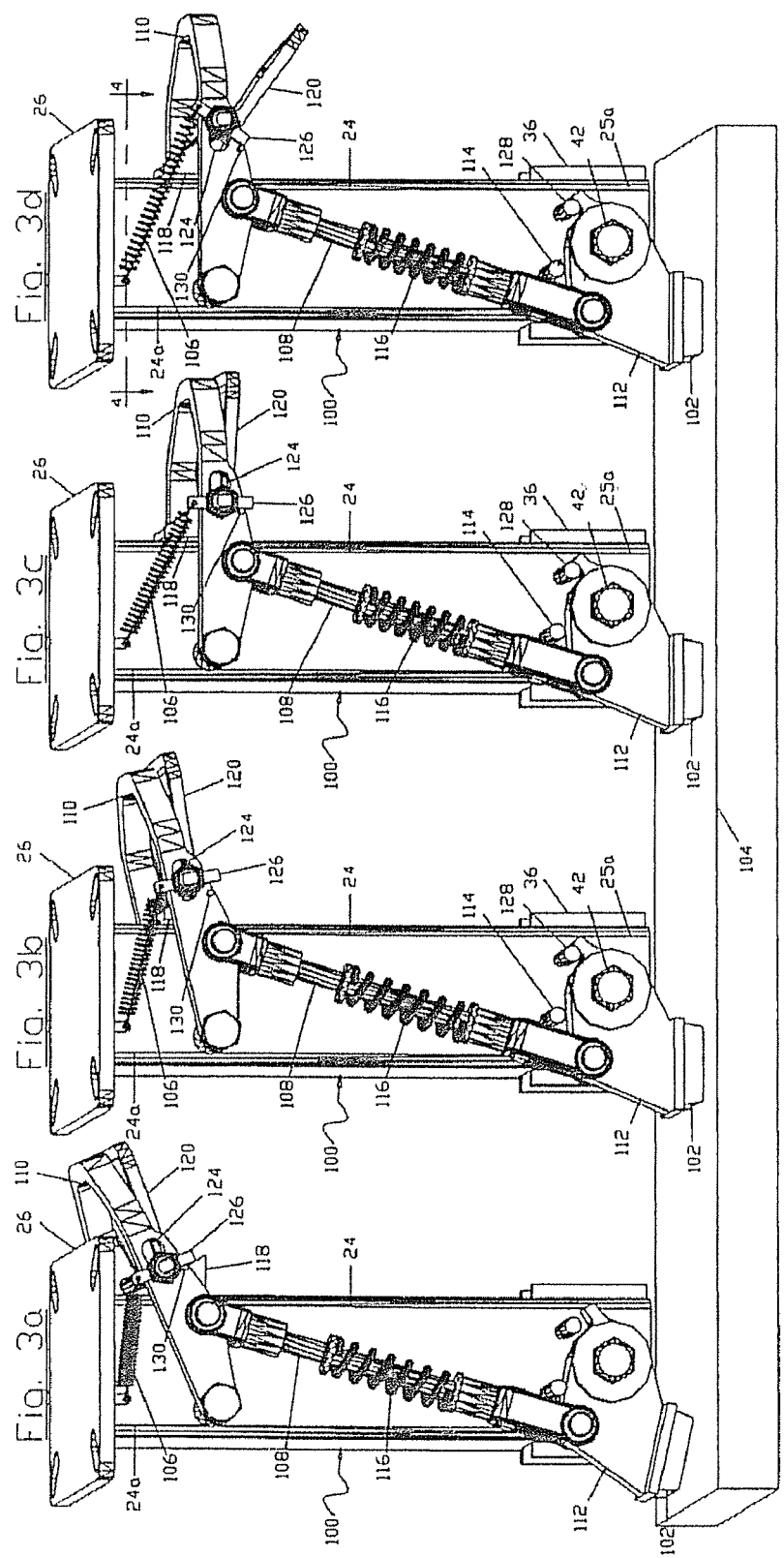
FIG. 3a is a fragmentary perspective view of the articulated caster shown in FIGS. 1 and 2, particularly showing a brake disengaged with a brake arm in a retracted position.
FIG. 3b is a fragmentary perspective view of the articulated caster similar to FIG. 3a, but showing the brake lever being shifted downward so that the brake arm contacts the surface but prior to the brake being engaged.
FIG. 3c is a fragmentary perspective view of the articulated caster similar to FIG. 3a, but showing the brake engaged with the brake arm contacting the surface.
FIG. 3d is a fragmentary perspective view of the articulated caster similar to FIG. 3a, but showing the brake being released.
Figure 4:
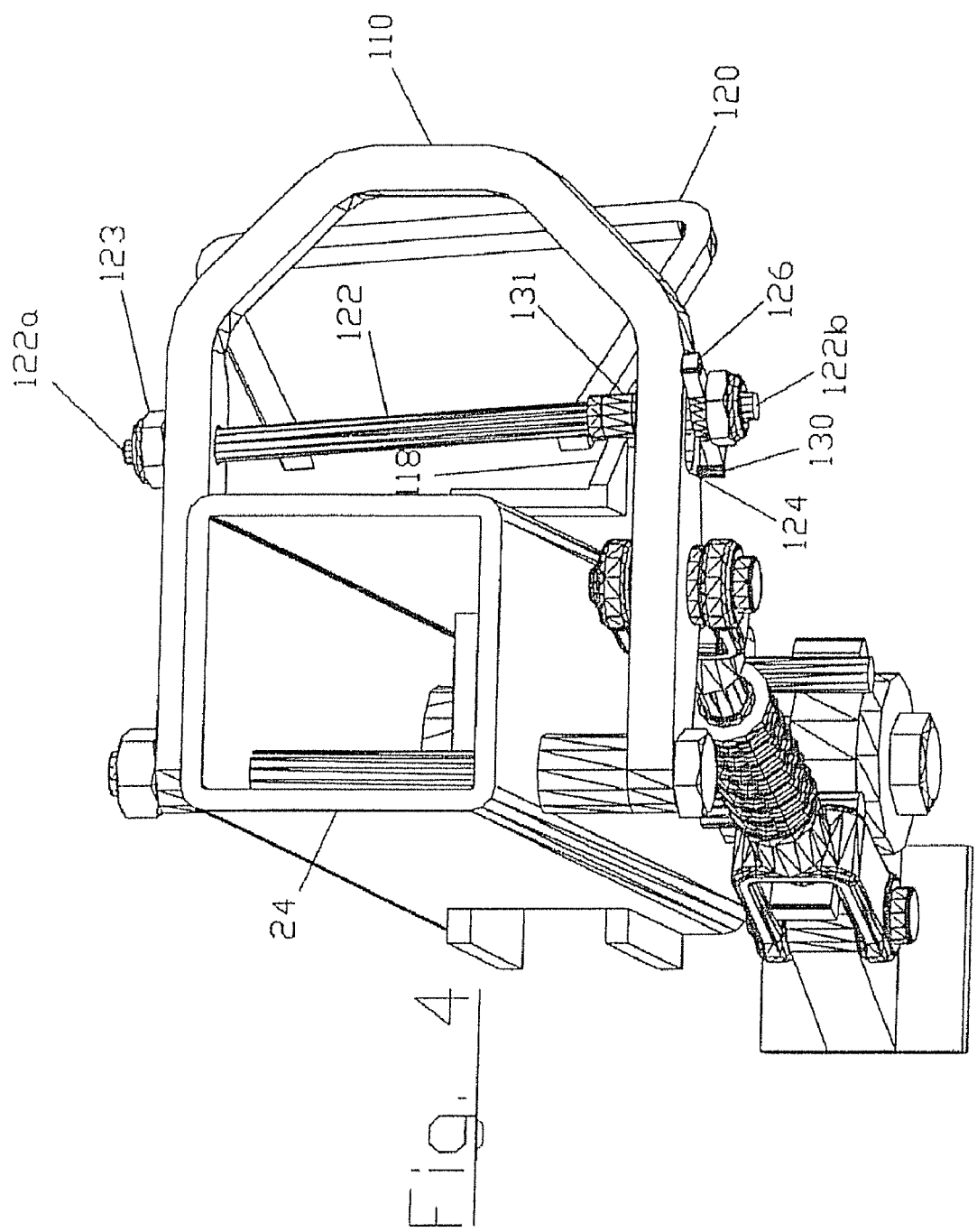
FIG. 4 is a fragmentary upper perspective view of the articulated caster shown in FIGS. 1-3, showing the brake in a disengaged position.

Referring now in particular also to FIGS. 3a-3d and also on occasion to FIG. 4, is shown a brake assembly, identified in general by the reference numeral 100.

FIG. 3a shows the brake assembly 100 in a first retracted position in which a brake pad 102 is elevated above a surface 104.

A return spring 106 is holding the brake assembly 100 in the first retracted position. This ensures that no braking force is applied when the brake assembly 100 is released (i.e., when it is in the first position).

A pivot rod 108 is pivotally attached at an upper end to a brake lever 110 and at an opposite end to a brake pad support member 112. The brake pad support member 112 is attached over one end of the first bolt 42, about which it is adapted to pivot.

There are of course other ways of pivotally attaching the brake pad support member 112. For example, a sleeve (not shown) may be welded to the pivot arm 24 and another bolt may be used to engage threads in the sleeve allowing the brake pad support member 112 to pivot about the other bolt or sleeve as desired. Alternatively, a pivot pin may be used as well as bushings, etc. These variations are useful in diminishing wear or improving smoothness of operation.

A first stop pin 114, attached to the pivot arm 24, prevents the brake pad support member 112 from retracting further, as urged by the return spring 106.

The pivot rod 108 preferably bears against a compression spring 116. In the first position, the compression spring 116 is somewhat relaxed because the pivot rod 108 is not supplying a force that is attempting to compress it.

A latch plate 118 is attached to one side of the pivot arm 24. The latch plate 118 includes an upper tapered surface and a flat bottom surface. A brake release lever 120 includes a shaft 122 that includes a first end 122a which passes through a hole provided in one side of the brake lever 110. A shaft nut 123 secures the shaft to the brake lever 110. The shaft 122 is adapted to rotate and tilt slightly within the holes provided.

The shaft 122 includes an opposite end 122b that passes through a slot 124 provided in an opposite side of the brake lever 110. An end rod 126 is attached to the opposite end 122b of the shaft 122. The end rod 126 retains the opposite end 122b of the shaft 122 in the slot 124.

One end of the return spring 106 is attached to one end of the end rod 126. The return spring 106 tends to urge the opposite end 122b of the shaft 122 of the brake release lever 120 to the left of the slot 124, as shown (i.e., toward the pivot arm 24). The return spring 106 also urges the brake release lever 120 toward the first position. In the first position, the shaft 122 is disposed adjacent to the left side of the slot 124 and above the latch plate 118.

As is described in greater detail hereinafter, the opposite end 122b of the shaft 122 is adapted to extend over the upper tapered surface of the latch plate 118 as it is lowered. Once the shaft 122 is below the flat bottom surface of the latch plate 118, the return spring 106 urges the opposite end 122b under the flat bottom surface, thereby retaining the shaft 122 and brake lever 110 in a second position in which a braking force is applied.

FIG. 3b shows the brake assembly 100 as a braking force is being applied. The brake lever 110 has been urged downward sufficiently so that a bottom edge of the brake pad 102 is beginning to contact the surface 104. The brake pad 102 is a replaceable wear item that is chosen for the specific application to provide an optimum coefficient of friction intermediate the brake pad 102 and the surface 104.

The opposite end 122b is extended away from the pivot arm 24 by the latch plate 118. Careful examination reveals that in FIG. 3b, the opposite end 122b of the shaft 122 is on the verge of being urged downward sufficient to clear the flat bottom surface of the latch plate 118. The return spring 106 is fully extended.

FIG. 3c shows the brake assembly 100 in the second fully engaged position. The brake lever 110 has been lowered by the user sufficient so that the shaft 122 has cleared the bottom of the latch plate 118. The return spring has urged the opposite end 122b of the shaft 122 to the left of the slot 124 and under the flat bottom surface of the latch plate 118 where the latch plate 118 now retains the brake lever 110 in the second position.

In this position, the brake pad 102 is lowered an amount sufficient to cause the lower surface of the brake pad 102 to be disposed below the surface 104. This preferably compresses the spring 116 and brake pad 102, or it may alternatively attempt to raise the object, or both. It is generally not preferred that the object be raised a greater amount above the surface 104 when the brake assembly 100 is engaged. A positive frictional engagement intermediate the pivot arm 24 of the caster 10 and the surface 104 by the brake pad 102 is what is desired and attained.

This eliminates the possibility of movement occurring intermediate the wheels 14-18 and the surface 104, a problem with prior types of caster brakes which can cause unwanted movement of the object being supported by the caster 10. It does not matter if the wheels 14-18 move or not, the object is stable and the caster 10 is applying a braking force directly to the surface 104.

Depending on the intended application of the caster 10, the amount of compression of the pad 102, the material chosen for the pad 102, and the stroke of the brake lever 110 (i.e., the downward and upward range of extension of the brake pad 102) are varied as desired. These and other factors are all design-specific variables. Accordingly, the brake assembly 100 is locked and engaged with the surface 104. It is latched in the second position and cannot be dislodged or released without further action, as described hereinafter.

It is also readily apparent to the user whether or not the brake assembly 100 is engaged. If the brake lever 110 is raised (i.e., if it is close to the flange plate 26), the brake is in the first position and no braking force is applied. If the brake lever 110 is displaced away from the flange plate 26, it is in the second position and maximum braking force is applied. A second stop pin 128 prevents over rotation of the brake pad support member 112.

The spring 116 is maximally compressed in the second position. This allows a constant force to be applied to the brake pad 102. The spring 116 also compensates for irregularities in the surface 104 and also for wear of the brake pad 102 over time.

FIG. 3d shows the brake assembly 100 being released from the second latched position. As shown, it is ready to automatically retract, under force supplied by the return spring 106, back into the first position.

To release the brake assembly 100, the brake release lever 120 is urged downward. As the brake release lever 120 is urged downward, the end rod 126 rotates. As the end rod 126 rotates, a bottom portion thereof contacts and bears against a brake release pin 130 that is attached to the brake lever 110.

As additional force is applied to the brake release lever 120 in a downward direction, the end rod 126 continues to bear against the brake release pin an amount sufficient to urge the opposite end 122b of the shaft 122 away from the pivot arm 24 until the opposite end 122b clears the latch plate 118, as shown in FIG. 3d.

The brake lever 110 is now free to return to the first position. Normally, the user allows the brake lever 110 to return quickly with a snap. An audible snap is heard on engagement and also on release. The spring 116 also supplies a force that, on release, helps urge the brake lever 110 to return to the first position.

If for some reason (i.e., an especially sensitive load being supported) and the user preferred, he or she could also gently allow the brake lever 110 to return to the first position rather than releasing all contact and allowing return spring 106 to urge it back abruptly.

Referring back to FIG. 4 momentarily, a roller sleeve 131 is disposed over the shaft 122 and is free to rotate about the shaft. The roller sleeve 131 is in contact with the latch plate 118 and because it rotates, it allows for easier and smoother operation.

Several important advantages are provided by the brake assembly 100. First, the location of brake is always the same when viewed from above. This allows the user to quickly access and apply the brake whereas with prior art caster brakes that are disposed on the wheels, their position varies and accordingly, they can not be quickly accessed as the wheels wobble or change directions.

Second, the brake can be applied safely and easily even while in transit. With prior art caster brakes, there is danger that the user can actually place his foot under the wheels where it can be run over or severely pinched. While not generally preferred, in an emergency or in anticipation of a needed stop, the brake assembly 100 can be quickly, safely, and predictably applied while in motion.

Third, the brake assembly 100 has two positions. The first position is no brake force whatsoever is applied. The second position is full, normal brake force is applied. The brake is either set (applied) or it is not. This produces predictable results. Prior caster brakes produce uncertain variable results where the braking force can vary widely. Worse yet, this variance can occur without any tactile or visual feedback occurring.

Prior caster brakes also are not securely latched and therefore are prone to sudden unpredictable release with possible damage to the object or even impact to people and other objects occurring.

Fourth, the report (noise) that occurs on setting (when the latch bar 122 snaps into place) and release provides a clear indication of the braking status to the user. When the brake is set, the user feels this engagement, typically through his shoe and into his foot. It is similarly felt on release. Either position can be verified visually as well, thereby providing confirmation of position via three senses, hearing, feeling, and sight.

Figure 5:
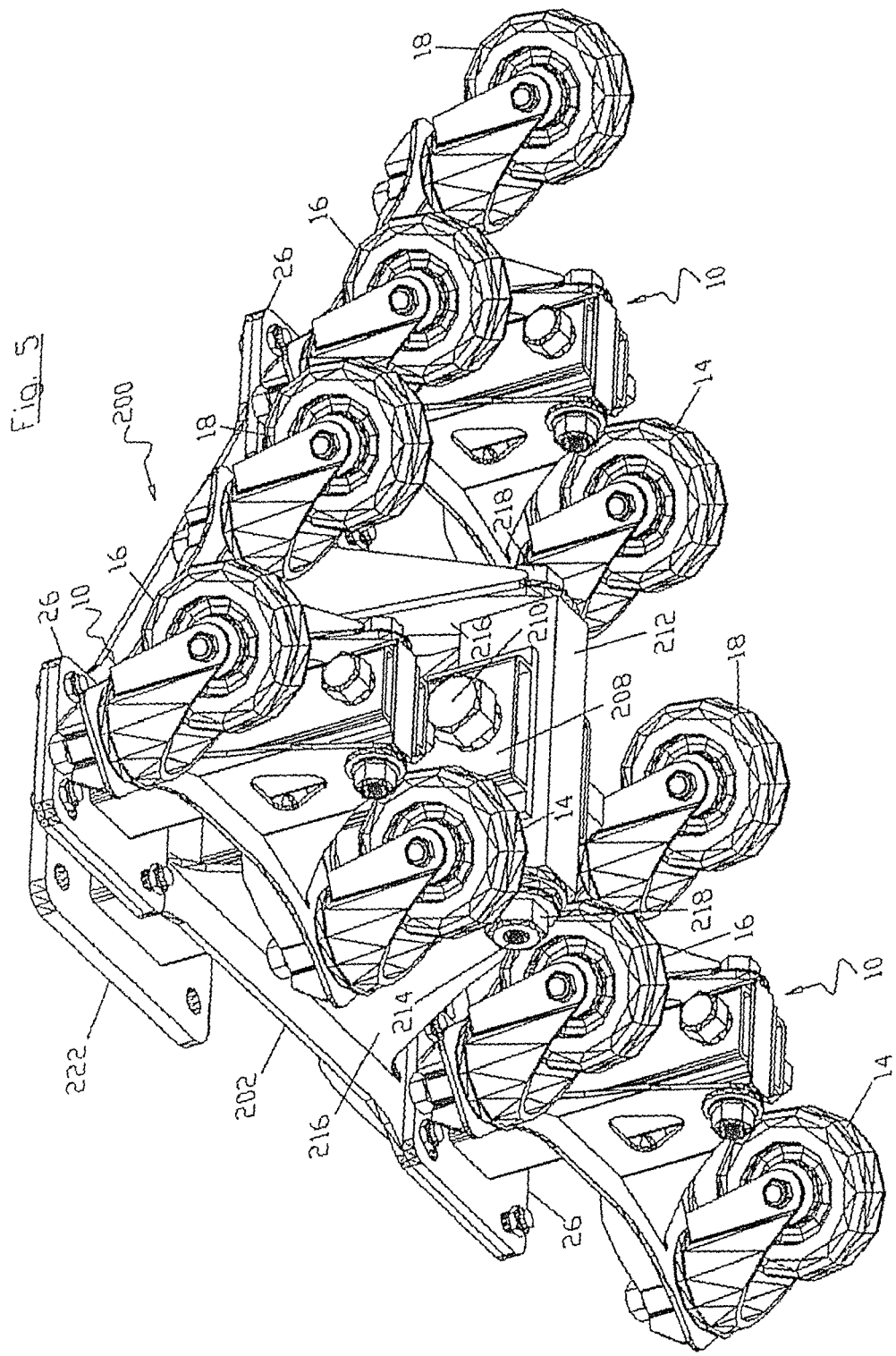
FIG. 5 is a lower perspective view of an articulated caster constructed in accordance with a second embodiment of the present invention.
Figure 6:
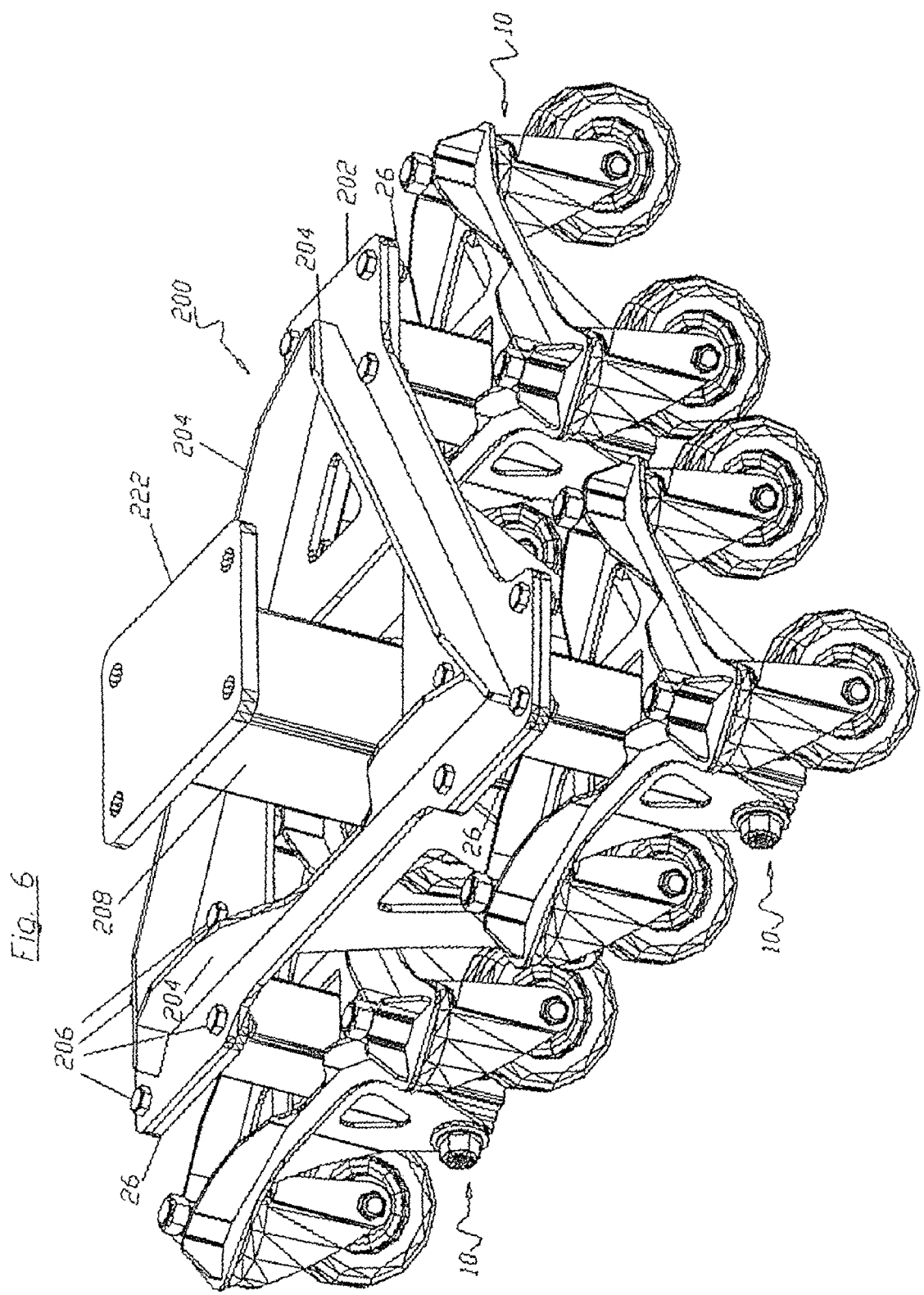
FIG. 6 is an upper perspective view of the articulated caster shown in FIG. 5.

Referring now to FIG. 5 and FIG. 6, is shown a modified articulated caster, identified in general by the reference numeral 200.

While the articulated caster 10, can of course be scaled to any desired size to accommodate a need for greater (or lesser) payload (i.e., carrying capacity), there is a potential disadvantage that can arise when substantially heavier payloads are encountered and a mere increase in the size of the articulated caster 10 is employed. That potential disadvantage is for the flange plate 26 to be elevated substantially higher as a result of an increased wheel 16 diameter size.

The modified articulated caster 200 solves this potential disadvantage by arranging three (or any number) of the articulated casters 10 together and attaching the flange plates 26 of each to an adapter plate 202.

The adapter plate 202 includes gusset plates 204 that are added to reinforce it, as necessary. Each of the flange plates 26 is secured to the adapter plate 202 by a plurality of bolts 206.

An enlarged pivot arm 208 is similar to the pivot arm 24 of the articulated caster 10. An enlarged first bolt 210 is used to secure the enlarged pivot arm 208 to an enlarged pivot block 212.

The enlarged pivot arm 208 is adapted to pivot about a center longitudinal axis of the enlarged first bolt 210 with respect to the enlarged pivot block 212.

A pair of enlarged threaded extensions 214 that extend from opposite sides of the enlarged pivot block 212 each pass through one of a pair of enlarged side members 216. A pair of enlarged lock nuts 218 secure each end of the enlarged pivot block 212 to one of the enlarged side members 216.

The enlarged pivot block 212 is adapted to pivot about a center longitudinal axis thereof with respect to the enlarged side members 216.

Together, the enlarged pivot block 212 and the enlarged first bolt 210 provide two-axis pivoting (i.e., a universal joint) for the enlarged pivot arm 208 with respect to the adapter plate 202 within a space provided by an enlarged opening 220 in the adapter plate 202.

An enlarged flange plate 222 is attached to an upper end of the enlarged pivot arm 208 and is used to attach the modified articulated caster 200 to either a platform or directly to a heavy object (not shown) with a substantial increase in carrying capacity and only a slight increase in height above grade of the enlarged flange plate 222 as compared to that of the flange plate 26.

Another benefit provided by the modified articulated caster 200 is an ability for all caster wheels 14, 16, 18 to individually adapt to small changes in the grade without substantially affecting the plane of the adapter plate 202 or the heavy object. In other words, the heavy object is not raised or lowered with respect to grade as the individual caster wheels 14-18 pass over small changes or fluctuations in the surface upon which they bear.

This makes is easier to move the heavy object because horizontal movement is free of vertical movement. It also provides a smoother ride for the heavy object, which does not rise and fall in response to the small fluctuations experienced by the wheels 14-18. This smoother ride helps prevent damage to the heavy object, much the same as the articulated caster 10 provides a smoother, safer ride for the object that it supports during transport.

Another benefit provided by the modified articulated caster 200 is that substantial changes in grade, for example changes in the slope of the grade that are encountered, are compensated for by movement (i.e., a rising and falling) of the individual wheels 14-18 as well as by the various articulated casters 10.

As the articulated casters 10 respond to changes in grade or when they must rise over more substantial objects (not shown), these changes are transferred to the adapter plate 202, which pitches in response to these variations. However, the heavy object remains substantially unaffected, disposed on the same plane above grade, due to the universal joint action provided by the mounting of the enlarged pivot arm 208 with respect to the adapter plate 202.

The combined ability of the individual articulated casters 10 to adapt to changes in grade by the wheels 14-18, and of the adapter plate 202 to adapt to more substantial changes in grade provides a method of supporting an object (or heavy object) that allows for optimum ease of transport, maintains the object at nearly a predetermined elevation above grade, keeps that elevation as low as possible even when a substantial carrying capacity is required, and isolates the payload (i.e., the object or heavy object) from fluctuations that occur on the surface. Rolling resistance is actually decreased. It becomes easier to change direction as well. Greater and more uniform floatation over the surface is attained as well.

Of course, any number of the articulated casters 10 can be used with a modified adapter plate (not shown). It is also possible to duplicate the overall process described above for even larger payloads or whenever greater floatation, less rolling resistance, or easier direction change is desired. For example, the enlarged flange plate 222 of the modified articulated caster 200 can be attached to a modified enlarged adapter plate (not shown) in which a plurality of the modified articulated casters 200, each of which having a plurality of articulated casters 10, can be used.

It is noted that typically, as more and more casters 10 are used, their size is scaled down accordingly. This provides the desired benefits with lower structures that better distribute the load and compensate for surface irregularities. Smaller wheels 14, 16, 18 can be used with multiple groupings of the casters 10 and still climb over substantial obstacles because of the articulation and floatation characteristics obtained.

A preferred method of distributing the load over a number of different carriages (i.e., the articulated casters 10) through the universal (or cross-axis) type of joints is herein disclosed. It is also possible to mount any of the joints (for the articulated caster 10 or the modified articulated caster 200) in a manner that provides pivotal motion about only one axis, instead of about two axes simultaneously, as the preferred embodiments herein disclose.

The modified articulated caster 200 can, of course, also be used with the brake assembly 100, as disclosed for with the articulate caster 10, as desired. If desired, a modified enlarged brake assembly (not shown) can be attached to the enlarged pivot arm 208.

Figure 7:
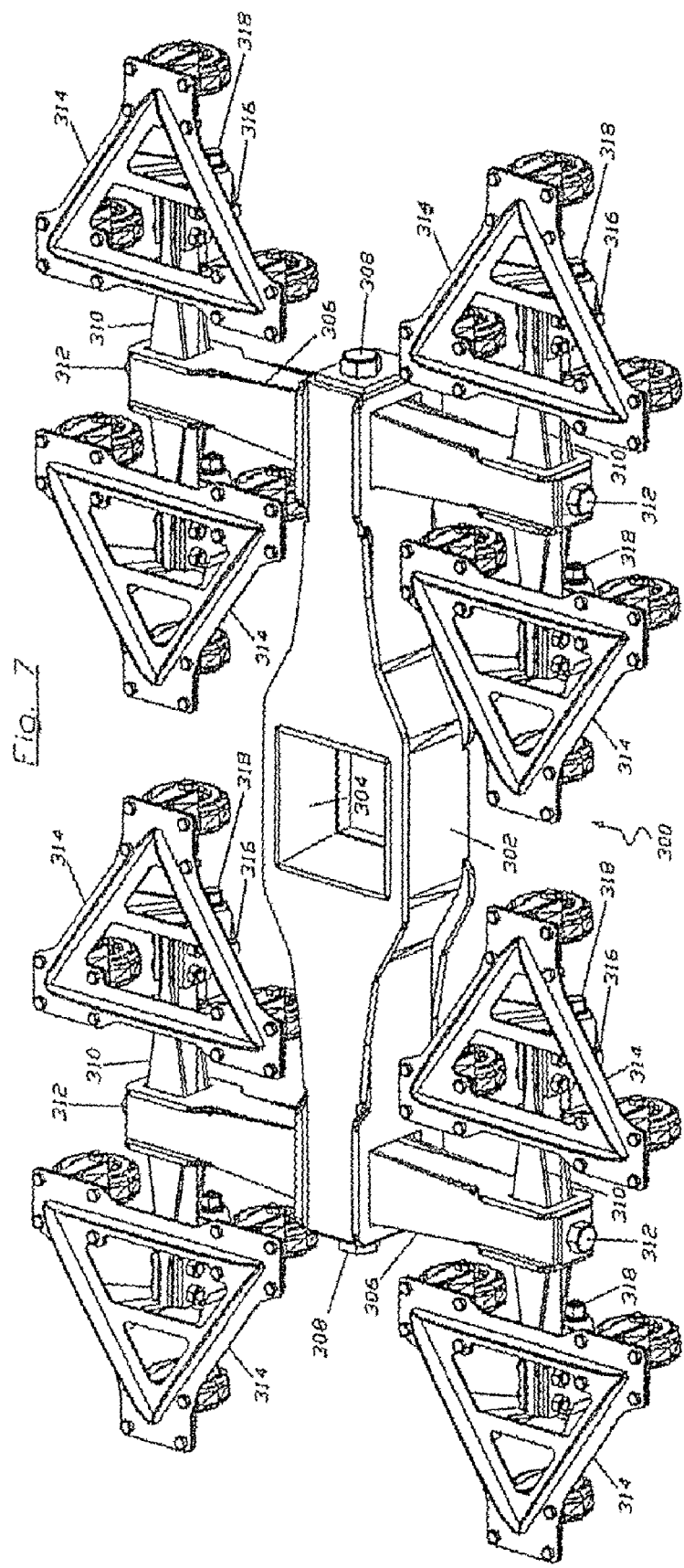
FIG. 7 is a perspective view of an articulated caster constructed in accordance with a third embodiment of the present invention.

Referring now to FIG. 7 is shown a second modified articulating caster, identified in general by the reference numeral 300.

The second modified articulated caster 300 includes a central beam 302 to which a payload object (not shown) is attached to a center recess 304 thereof.

A pair of transverse beams 306 are attached to opposite ends of the central beam 302 by an end bolt 308. Each of the transverse beams 306 is adapted to pivot around the axis of the end bolts 308 a limited amount.

Attached to each end of each transverse beam 306 is a second transverse beam 310. Each second transverse beam 310 is adapted to pivot around a second end bolt 312 that secures the second transverse beam 310 to each end of the transverse beam 306.

Accordingly, pivoting about two axes is provided, the first axis being with respect to a center longitudinal axis of the end bolt 308 and the second being with respect to a center longitudinal axis of the second end bolt 312, the two axes being perpendicular with respect to each other.

The end of each of the second transverse beams 310 is pivotally attached to a caster assembly 314 by a caster pivot bolt 316. The caster pivot bolt 316 provides an axis that is parallel to that of the second end bolt 312 and it allows the caster assembly 314 to articulate about the caster pivot bolt 316.

This allows the smaller caster assemblies 314 to articulate about this axis to accommodate smaller fluctuations in the surface while the second end bolt 312 allows the second transverse beams 310 to pivot about a parallel axis to accommodate larger variations in the grade of the surface without substantially affecting the position of the central beam 302. Usually, the smaller caster assemblies 314 are able to adapt and accommodate the greater part of any variations in the grade of the surface.

A lower caster pivot bolt 318 includes a longitudinal axis that is parallel to that of the end bolts 308 and allows the caster assemblies 314 to pivot about this axis to accommodate smaller grade fluctuations while the transverse beams 306 similarly pivot about the end bolts 308 to accommodate larger grade fluctuations.

It is important to note that the second transverse beam 310 extends out of the side of the caster assembly 314. This provides substantial benefits where low structure height is attained. This general concept is discussed in greater detail hereinafter (see discussion appertaining to FIG. 9).

Figure 8:
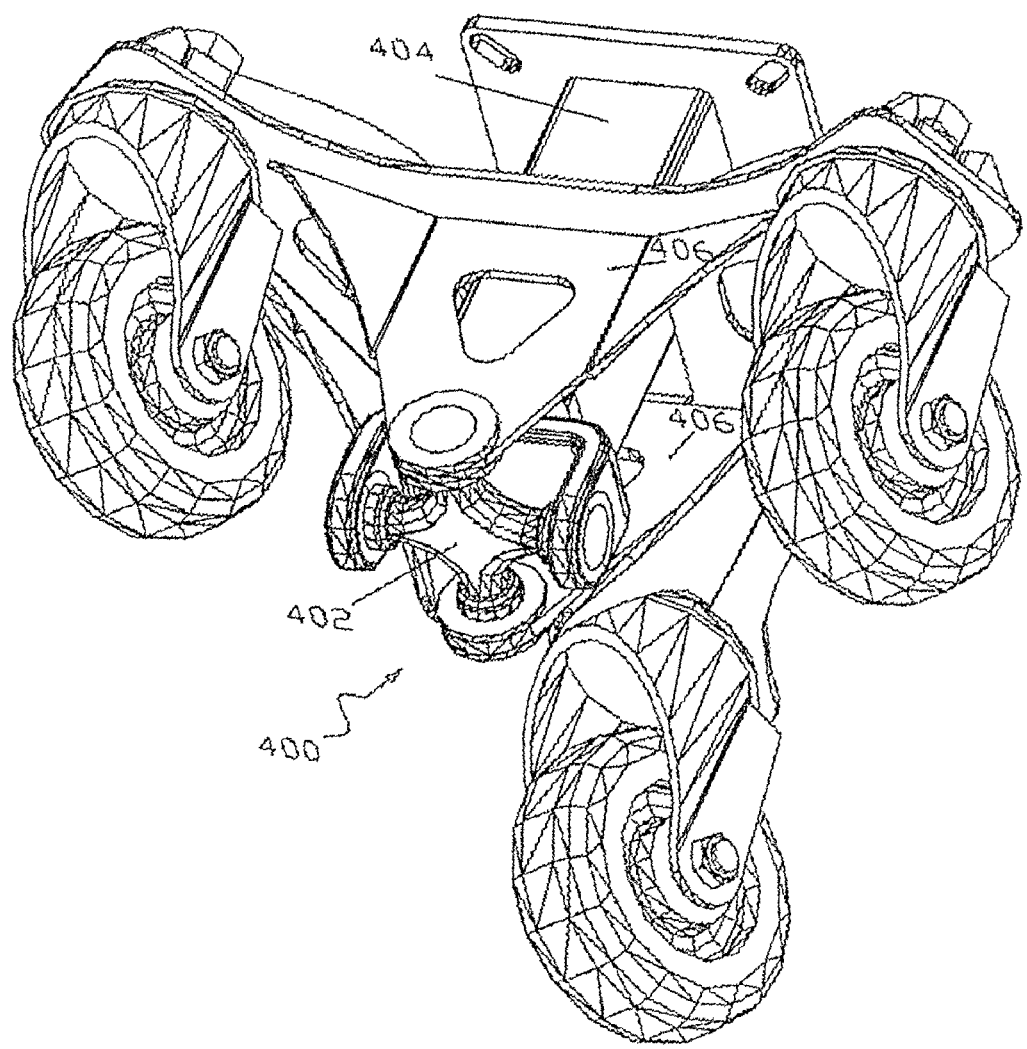
FIG. 8 is a lower perspective view of an articulated caster constructed in accordance with a fourth embodiment of the present invention.

Referring now to FIG. 8 is shown a third modified caster 400 that includes a conventional type of a universal joint 402 attached to a modified pivot arm 404 and to a pair of second modified side members 406.

The second modified side members 406 are each adapted to retain a bearing race into which the end of the universal joint 402 is secured.

The modified pivot arm 404 is adapted to retain a pair of bearing races into which the two remaining ends of the universal joint 402 are secured.

Accordingly, the modified pivot arm 404 is adapted also to pivot about two axes that are perpendicular with respect to each other, each one of the two axes passing through an opposite end of the universal joint 402.

While the universal joint 402 may be used to provide the desired articulation for the third modified caster 400, it may be more difficult to assemble, maintain, or replace than the previously disclosed embodiment and it is reserved for those application where its use is preferred.

Figure 9:
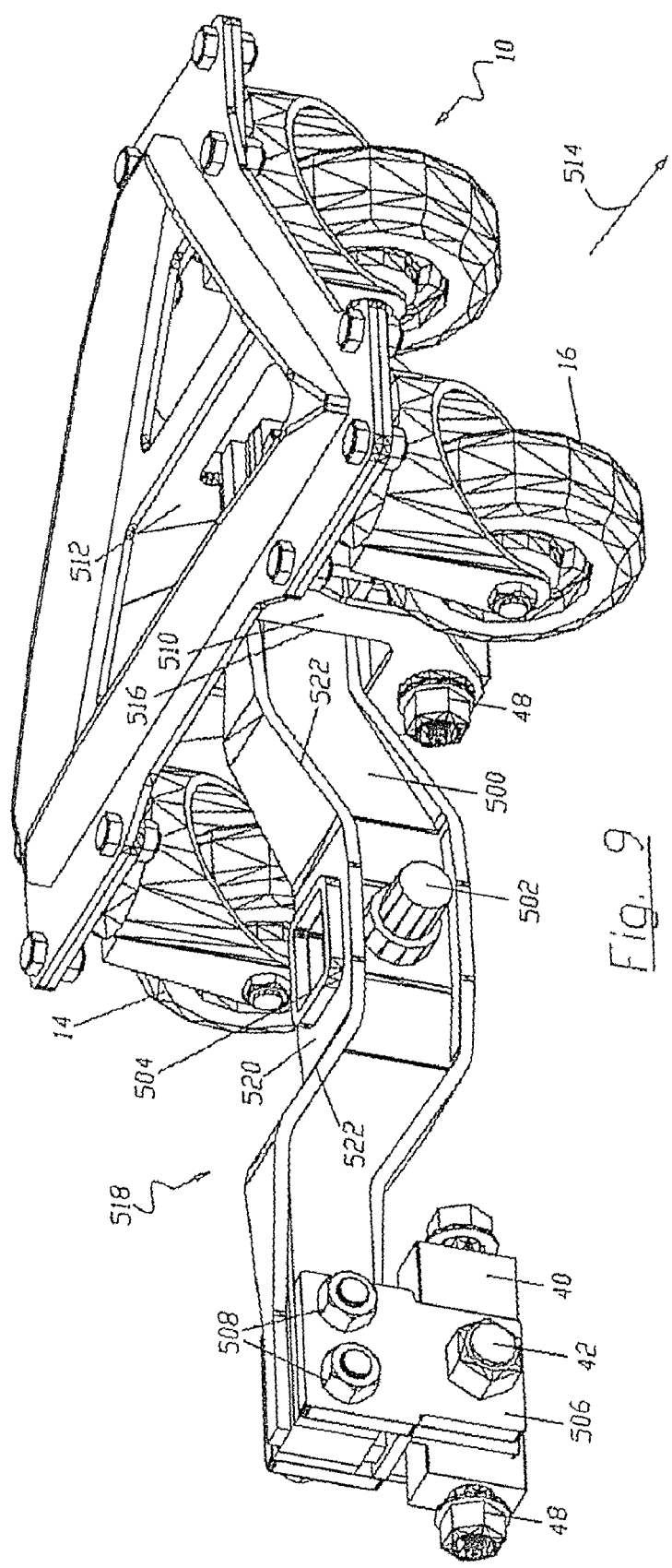
FIG. 9 is a fragmentary perspective view of an articulated caster constructed in accordance with a fifth embodiment of the present invention.

Referring now to FIG. 9 is shown a horizontal pivot arm 500. The horizontal pivot arm 500 does not extend upward from the caster 10 but rather extends out from the side while still maintaining the full range of articulation as previously described. A very low profile is also achieved because the horizontal pivot arm 500 does not extend upward. Other substantial benefits are also attained by use of the horizontal pivot arm 500 and are described hereinafter.

Each end of the horizontal pivot arm 500 is attached to one of the casters 10. Only the right caster 10 is shown in the drawing figure. The left caster is not shown to better illustrate how the horizontal pivot arm 500 is attached to each of the casters 10 so as to maintain articulation about the two axes.

The horizontal pivot arm 500 is secured to a pair of raised side members 506 by a pair of bolts 508. Each of the raised side members 506 are, in turn, pivotally attached to the pivot block 40 by the first bolt 42. The threaded extensions of the pivot block 40 are secured by the pair of lock nuts 48 and pivotally secure the pivot block 40 to a second modified side member 510 and to an opposite side member 512.

The second modified side member 510 is disposed between two of the caster 10 wheels 14, 16. A preferred direction of movement by the caster 10 is shown by arrow 514. The second modified side member 510 includes a plane that generally aligns with the arrow 514.

An enlarged side member opening 516 is provided in the second modified side member 510 through which the horizontal pivot arm 500 extends. The enlarged side member opening 516 provides clearance for the horizontal pivot arm 500 to move relative to the second modified side member 510 as the caster 10 changes attitude during transit in response to irregularities of the floor surface beneath the caster 10.

The opposite side member 512 does not require the enlarged side member opening 516 because the horizontal pivot arm 500 does not pass through it, although the enlarged side member opening 516 can be included in the opposite side member 512, if desired.

The horizontal pivot arm 500 includes a lower portion in the middle identified in general by the reference numeral 518. The lower portion 518 includes a flat bottom member 520 connected to two angled sides 522.

A circular bearing shaft 502 is attached to an outside of the lower portion 518, below the flat bottom member 520.

A center load point 504 opening is provided proximate the bearing shaft 502. The circular bearing shaft 502 is useful for connecting a plurality of the horizontal pivot arms 500 together, for multiple ganging of the casters 10, and it use is described in greater detail hereinafter.

The lower portion 518 keeps the geometry low, which allows for a lowered elevation of any object, which is preferred. The horizontal pivot arm 500 allows for connection together of a pair of casters 10 (only the one is shown) to divide and support the weight of the load between them. Accordingly, each caster 10 supports only about one-half the load while still fully adapted to articulate about the two axes with respect to the horizontal pivot arm 500.

Figure 10:
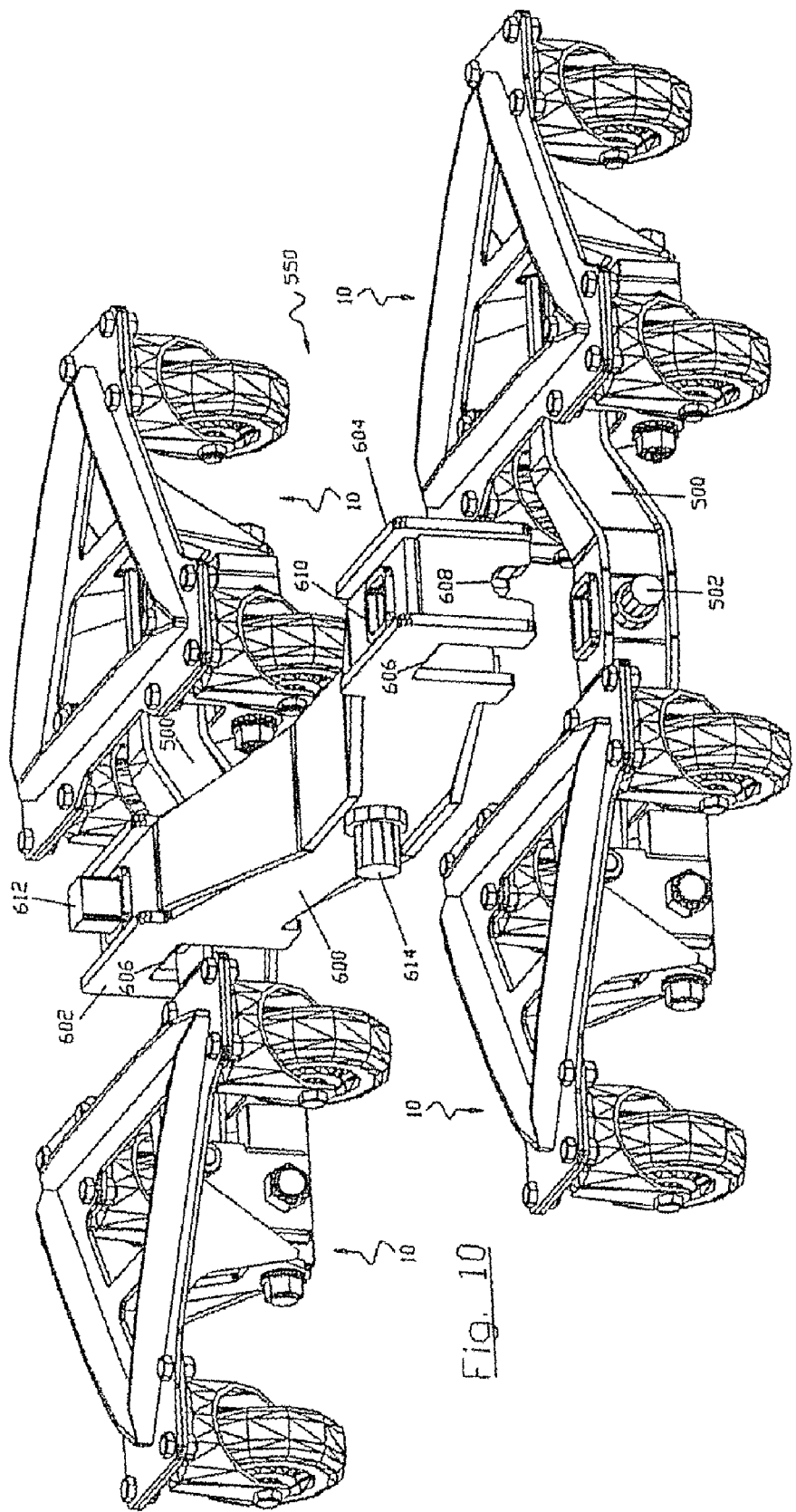
FIG. 10 is a partially-exploded perspective view of the articulated caster of FIG. 9.

Referring now to FIG. 10 is shown an interlocking system, identified in general by the reference numeral 550. Four casters 10 are each connected together in pairs by one of the horizontal pivot arms 500.

The two pairs of interconnected casters 10 are then disposed in a parallel spaced-apart orientation. An intermediate member 600 is used to connect the two pairs of casters 10 together and it includes a lowered center portion and a pair of opposite ends 602, 604.

The opposite ends 602, 604 include side cutouts 606 that allow each end of the intermediate member 600 to be placed atop a center of the lower portion 518 of a respective one of the horizontal pivot arms 500. An arcuate cutout 608 is provided at each of the opposite ends 602, 604.

The arcuate cutout 608 rests on top of the bearing shaft 502 thereby allowing for side to side articulation of the intermediate member 600 along a center longitudinal axis of the bearing shaft 502 and with respect to each of the horizontal pivot arms 500. A center load point connection 610 allows passage of a load member 612 to the horizontal pivot arm 500 or, if preferred, the connection can occur within the opposite ends 602, 604, as desired. The load member 612 conveys the weight of the load to the device.

The intermediate member 600 is simply placed atop the two horizontal pivot arms 500. The arcuate cutout 608 and the side cutouts 606 secure the two horizontal pivot arms 500 to the intermediate member 600. In use, any applied load only tends to further urge the intermediate member 600 down thereby further securing it to the two horizontal pivot arms 500. This allows for rapid "ganging" (i.e., joining) together of pairs of the casters 10.

A second bearing shaft 614 attached to the intermediate member 600 allows another intermediate member (not shown) to be placed over two of the intermediate members 600 thereby connecting eight casters 10 together. This further distributes the weight of the load while allowing each individual caster 10 to articulate over surface irregularities.

This results in the capacity to transport up to heavy loads that are not elevated above the surface a significant amount and to do so with especially low rolling resistance. Also, being able to utilize a great many wheels 14, 16, 18 to support a load (whenever two or more of the casters 10 are used) allows for a wide selection in the type of material used to form the wheels (the portion that contacts the surface). Softer materials can be used as well as hard materials.

A wide range of design flexibility is thereby attainable. Materials, for example, that can withstand insertion into an environmental chamber and which can experience a wide temperature variation, but which have a limited load carrying ability can now be used to form the wheels 14, 16, 18 when multiple groups of the casters 10 are ganged together. Other more economical materials can similarly be used. Materials that provide increased friction, low rolling noise, etc. can instead be used to form the wheels 14, 16, 18 that previously, when a single type of a conventional caster (not shown) was used, were not viable design choices.

Figure 11:
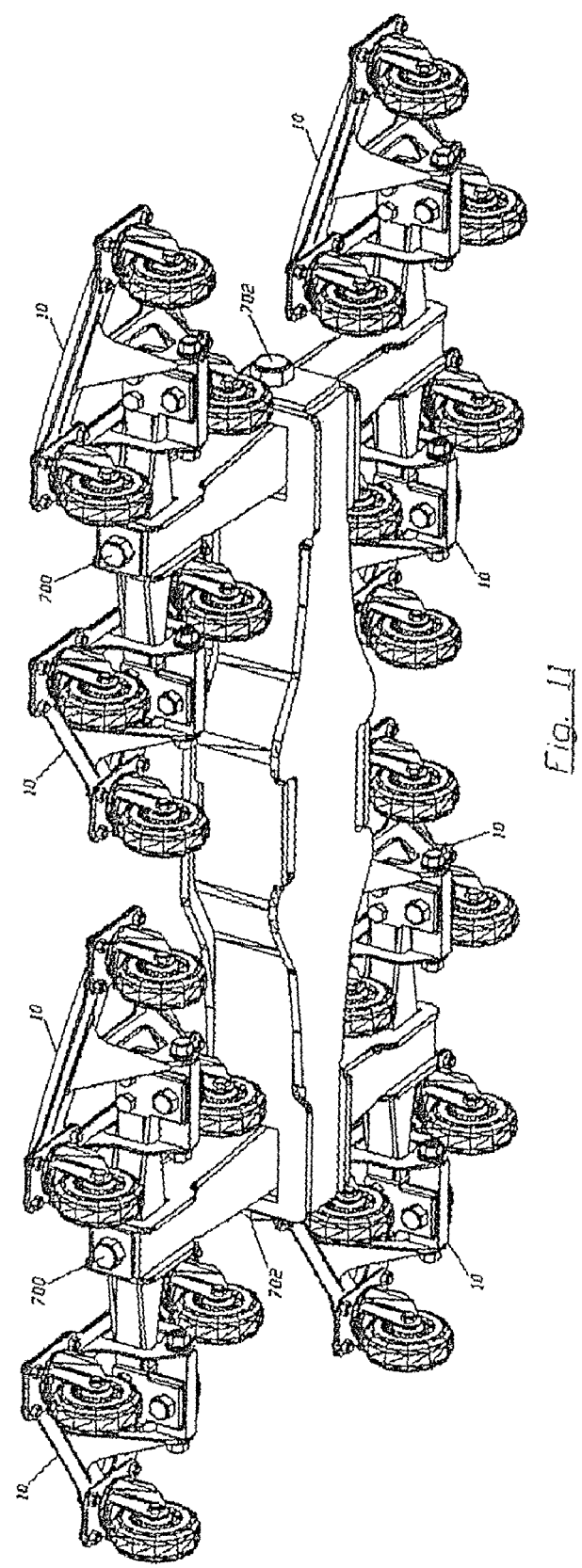
FIG. 11 is a lower perspective view of the articulated caster shown in FIG. 7.

Referring now to FIG. 11 is shown another method for ganging multiple pairings of the casters 10 together. The method shown includes pivot bolts 700, 702 that pivotally secure the assemblies together, which pass through openings that are provided. For certain applications, this is preferred. The example shown includes eight casters 10, although any number of casters 10 can be connected together, as desired, in any of a variety of possible ways.

Turning to FIGS. 12-22, an alternative embodiment of the present invention is depicted. For the sake of brevity, the remaining description will focus primarily on the differences of this alternative embodiment from the embodiments described above.

Figure 12:
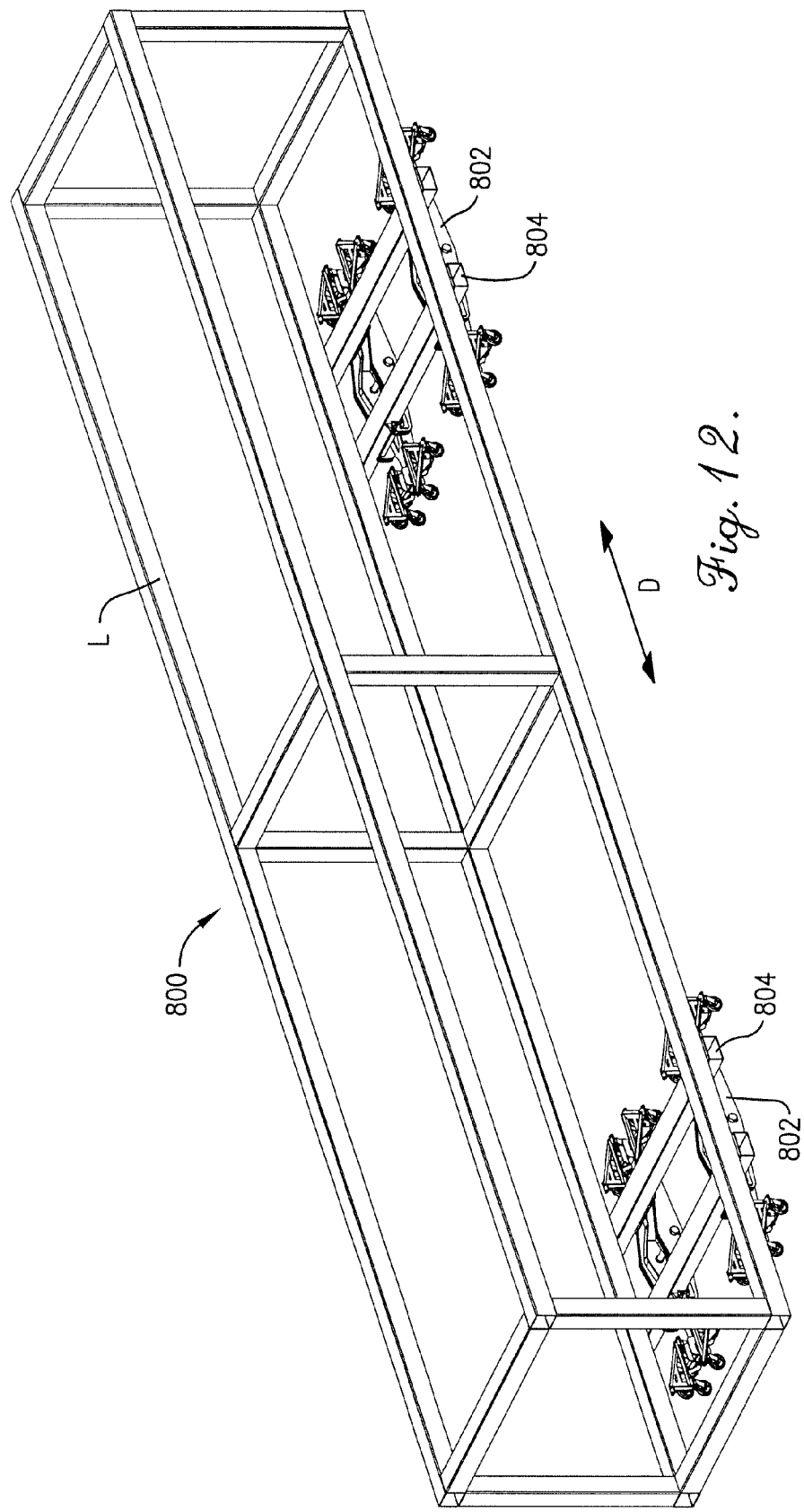
FIG. 12 is an upper perspective view of an assembly constructed in accordance with a sixth embodiment of the present invention including four carriages supporting a load thereon.

Initially turning to FIG. 12, a carriage assembly 800 is constructed in accordance with a sixth embodiment of the present invention. The assembly 800 includes four carriages 802 that are used to support a load L that is substantially rigid. The load L includes forklift tubes 804 that are each removably attached to two of the carriages 802. Each carriage 802 provides a stable platform for supporting relatively large loads with small caster wheels on an irregular surface. The carriage 802 broadly includes a frame 806 and casters 808 (see FIG. 13).

Figure 13:
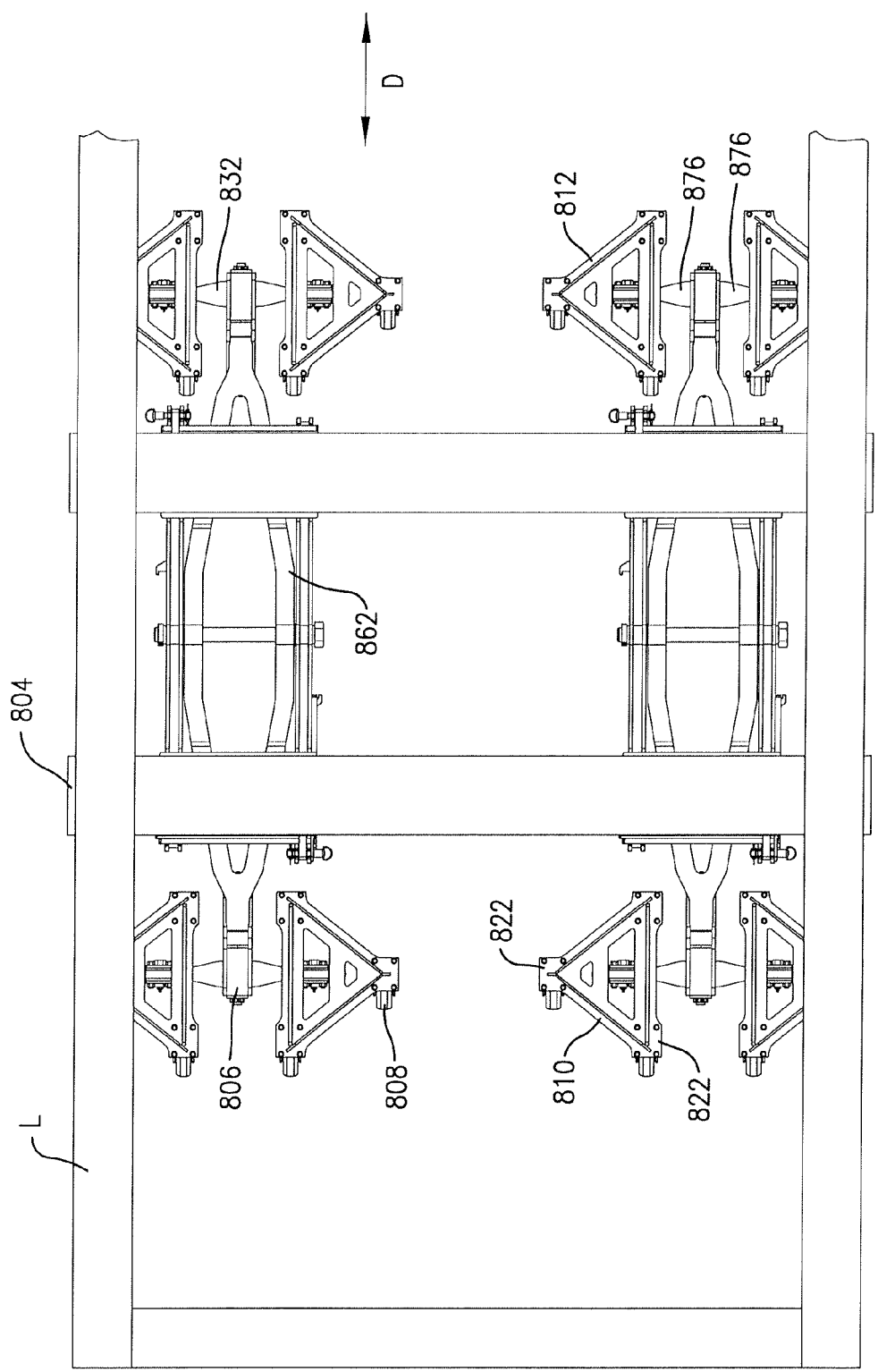
FIG. 13 is a fragmentary top view of the assembly shown in FIG. 12, particularly showing a pair of the carriages adjacent one end of the load.
Figure 14:
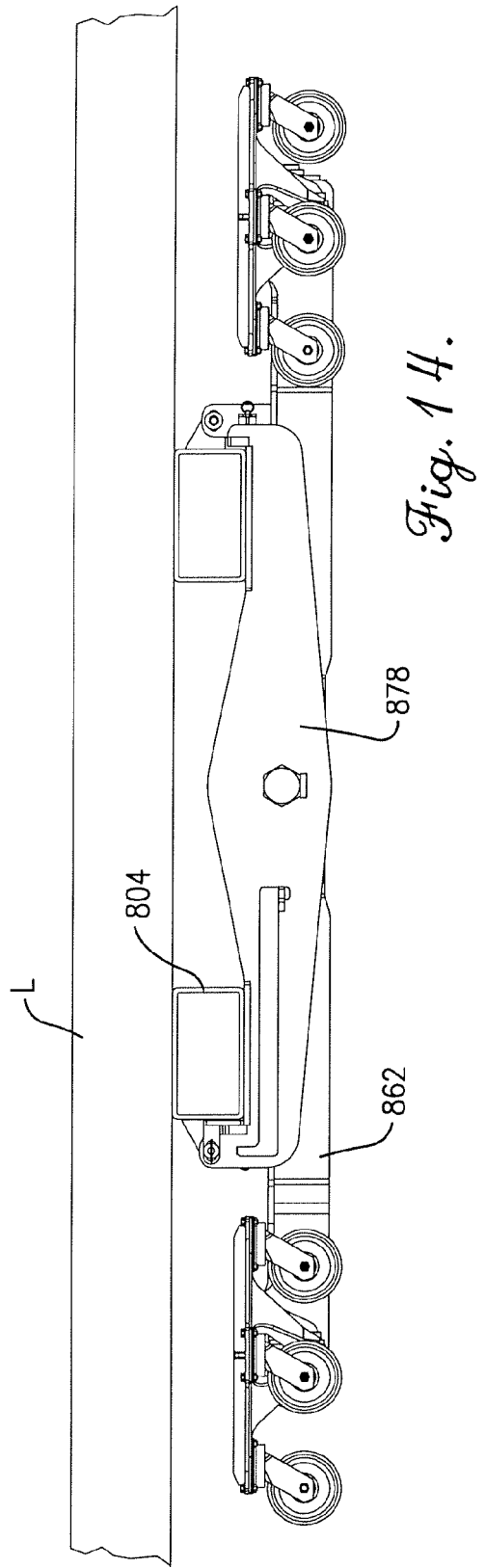
FIG. 14 is a fragmentary elevation view of the pair of carriages shown in FIG. 13.
Figure 15:
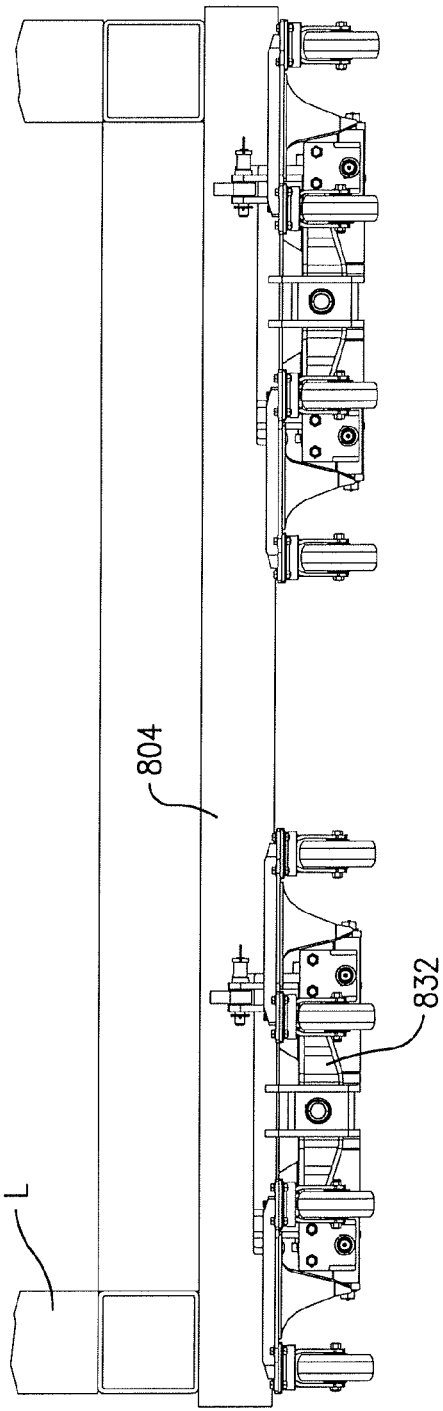
FIG. 15 is a fragmentary end elevation view of the pair of carriages shown in FIGS. 12 and 13.

Turning to FIGS. 13, 19, and 20, the frame 806 includes articulated base sections 810 that each interconnect three of the casters 808 in a triangular orientation. As will be discussed further, the base section 810 and casters 808 cooperatively provide a self-supporting caster assembly 812. The base sections 810 are substantially unitary and rigid and each include a substantially flat caster attachment portion 814 and upright bracket portions 816 extending downwardly from the attachment portion 812. The base sections 810 further include bushings 818 that extend through a bore of the bracket portion 816 and a spacer 820 that is mounted adjacent the bushing 818. The caster attachment portion 814 includes spaced apart flanges 822 with holes for receiving mounting bolts 824 that attach the casters 808. Additional details of another similarly constructed and preferred base section are disclosed in the incorporated application Ser. No. 10/886,369.

The casters 808 include a pivotal body 826 with a mounting bracket 828 and a caster wheel 830 that is rotatably mounted within the pivotal body 826. The caster wheel 830 is preferably made of nylon, but could also be made of other materials such as steel or rubber. The term caster, as used herein, is defined to be a rotatable wheel that is pivotally coupled to a structure, preferably about an upright axis.

The casters 808 are attached to the base sections 810 with mounting bolts 824 that extend through the flange holes and through holes in the mounting bracket 828. With respect to each of the base sections 810, three of the casters 808 are preferably spaced apart in a triangular arrangement with substantially equal spacing therebetween. Two of the casters 808 are longitudinally spaced fore-and-aft along a preferred direction of travel D. A third caster 808 is transversely spaced from the two casters 808 and longitudinally spaced between the two casters 808. The three-caster arrangement allows the caster assembly to support itself independently of other supporting structure. While the preferred caster assembly 812 has three casters 808 as discussed above, the principles of the present invention are applicable to the caster assembly 812 having alternative types of wheels, alternative numbers of casters 808, or an alternative arrangement of the casters 808 relative to the base section 810.

Turning to FIG. 13, the individual caster assemblies 812 are arranged so that the preferred direction of travel D for each is substantially parallel to the preferred direction of travel D for the other caster assemblies. This permits the casters 804 to pass sequentially over an obstacle. Additional preferred details concerning the illustrated arrangement of caster assemblies 812 within the carriage 802 as well as other preferred caster arrangements are disclosed in the incorporated application Ser. No. 10/886,369 and in co-pending U.S. patent application Ser. No. 11/277,538, filed Mar. 27, 2006, entitled ARTICULATED CASTER, which is hereby incorporated by reference herein.

Turning to FIGS. 19 and 20, the frame 806 further includes a transverse intermediate section 832 and an articulating block 834 with fasteners 836, 838 for assembling one of the base sections 810 to each end of the transverse intermediate section 832. The threaded fasteners 836 include a grease fitting 840 and a bore 842 that communicates with the grease fitting 840. The illustrated block 834 has a solid form and is elongated with ends 844 spaced apart so that the block 834 closely fits between the bracket portions 814. The block 834 further includes threaded axial holes 846 that extend from each end 844 and a transverse through-hole 848 that is perpendicular to the threaded holes 846 and extends through the middle of the block 834. The block 834 also includes an annular groove (not shown) that partly encircles the through-hole 848. While the illustrated block 834 is solid and substantially shaped as a cuboid, the principles of the present invention are applicable to a block having alternative shapes and voids. For example, the block 834 may be formed in the shape of a hollow rectangular box. The details of such an alternative preferred embodiment are disclosed in co-pending U.S. patent application Ser. 11/277,557, filed Mar. 27, 2006, entitled ARTICULATED CASTER WITH PIVOT BOX JOINT, which is hereby incorporated by reference herein.

Figure 21:
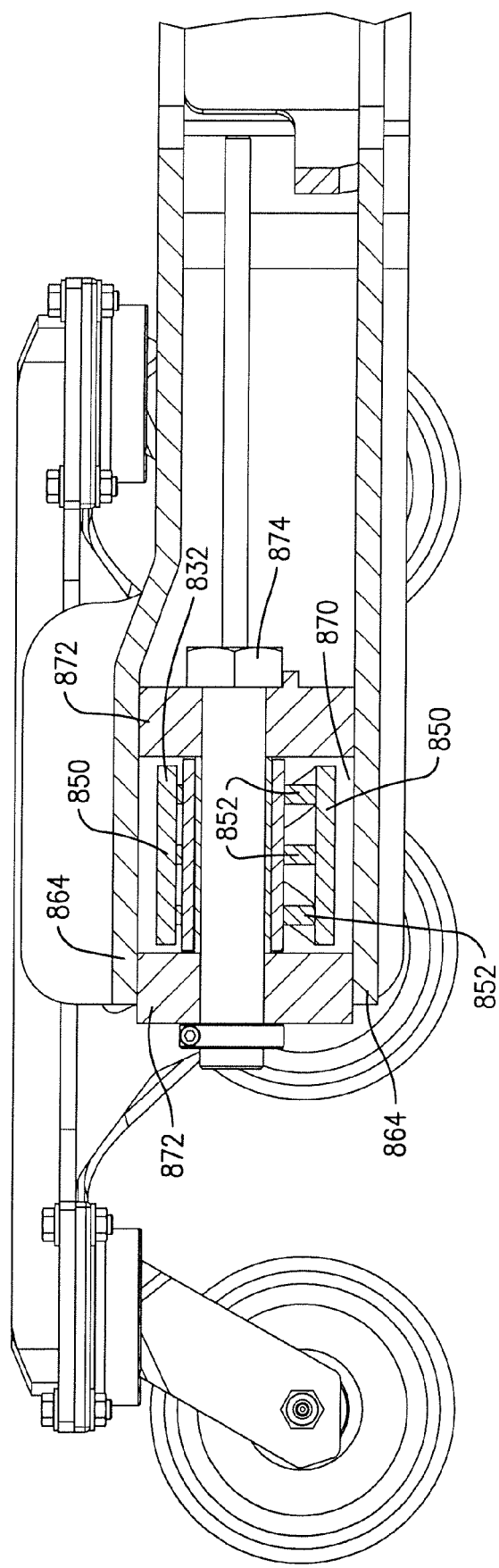
FIG. 21 is a greatly enlarged cross-sectional view of the carriage taken along line 21-21 in FIG. 16.
Figure 22:
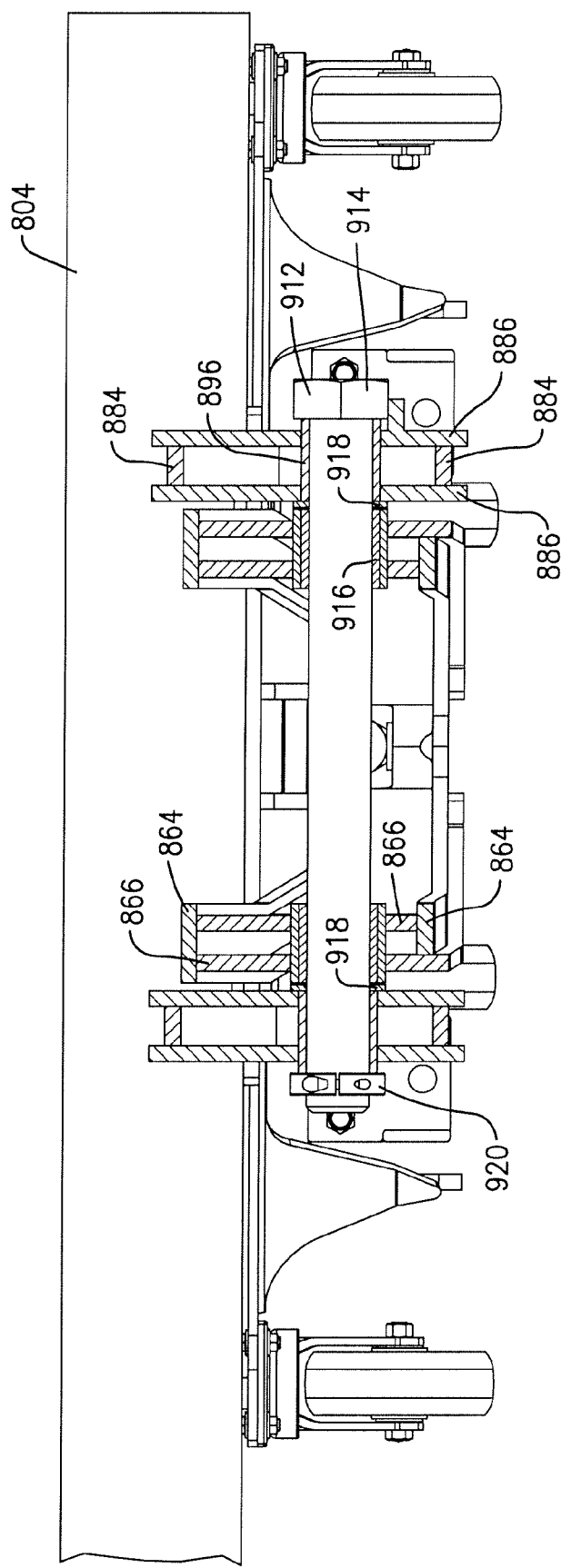
FIG. 22 is a greatly enlarged cross-sectional view of the carriage taken along line 22-22 in FIG. 16.

Turning to FIGS. 21 and 22, the block 834 is arranged with each end 844 adjacent to one of the bracket portions 816. The threaded holes 846 are aligned with the bores of the bracket portions 816. The bolt fasteners 836 are extended through the respective bushing 818 and threaded into the block 834 to secure the block 834 within the base section 810 and permit relative pivotal movement therebetween about a longitudinal axis of the block 834.

Turning to FIGS. 19-22, the transverse intermediate section 832 is preferably a welded beam structure with top and bottom webs 850 and inner and outer ribs 852 that are all welded together in a unitary form. Adjacent to each end of the transverse intermediate section 832, a pair of adapter plates 854 are attached with fasteners 856 and spacers 858. The transverse intermediate section 832 also includes a U-shaped shim 860.

The transverse intermediate section 832 is attached to the block 834 by arranging the block 834 within the U-shaped shim 860. The shim 860 and bracket portions 814 include substantially flat bearing surfaces that slidably engage the corresponding block bearing surfaces and thereby support the block 834. The fastener 838 includes a bolt that is extended through the block 834, shim 860, and adapter plates 854. The block 834 includes opposite longitudinal bearing surfaces and transverse bearing surfaces adjacent to each of the ends 844. The shim 860 and bracket portions 814 include substantially flat bearing surfaces that slidably engage the corresponding block bearing surfaces and thereby support the block 834. Thus, the transverse intermediate section 832 is pivotal relative to the block 834 about a transverse axis of the block 834. The sections 810, 832 are joined with the block 834 in a pin-and-block universal joint assembly with the base section 810 being pivotal relative to the transverse intermediate section 832. Furthermore, the longitudinal and transverse axes provide base pivot axes that are preferably aligned longitudinally and transversely relative to the carriage 802 and to the direction D. However, it is also within the ambit of the present invention that the base pivot axes are alternatively aligned relative to the carriage 802 and to the direction D. Also, the principles of the present invention are equally applicable to assembling the sections 810, 832 with other types of universal joints or pivotal joints (e.g., a ball-and-socket joint). Additional details concerning the preferred universal joint are disclosed in the incorporated application Ser. No. 10/886,369.

Each caster assembly 812 is pivotal about the fasteners 836, 838 and relative to the transverse intermediate section 832 to provide a "walking-beam" suspension. Moreover, the pivotal axes of the illustrated joint cooperate to provide an omnidirectional walking-beam. In other words, the joint permits the base sections 810 to pivot about other substantially horizontal axes. Thus, the illustrated walking-beam suspension permits all of the casters 808 attached to the base section 810 to remain in contact with the surface as the caster assembly travels over most obstacles or otherwise uneven surfaces. The illustrated walking-beam thereby permits load-sharing between the sections 810 and the individual casters 808. Additional features of the walking-beam are disclosed in the incorporated application Ser. No. 10/886,369.

Turning to FIGS. 13-17 and 22, the frame 806 further includes a longitudinal intermediate section 862 that is pivotally attached to transverse intermediate sections 832. The intermediate sections 832, 862 cooperatively provide a linkage with relative pivotal movement between the sections 832, 862 at a linkage joint having a linkage pivot axis parallel with the longitudinal intermediate section 862, as will be further described. The longitudinal intermediate section 862 preferably includes top and bottom webs 864 and ribs 866 that are welded to form a unitary beam. Each end 868 of the longitudinal section 862 includes a slot 870 (see FIG. 21) formed by the webs 864 and cross-members 872 with the slot 870 receiving the corresponding transverse section 832 therein.

The transverse intermediate sections 832 are secured within the respective slots 870 by extending and securing fastener 874 therethrough. The fastener 870 also extends through the cross-members 872 so that the intermediate sections 832, 862 are pivotal relative to each other about the respective fastener 874. The intermediate sections 832, 862 are assembled so that the transverse sections 832 provide outrigger arms 876 that extend in opposite directions from the longitudinal section 862. In other words, each transverse section 832 is pivotal relative to the longitudinal intermediate section 862 to provide a "walking-beam" suspension. Thus, the transverse section 832 permits load-sharing between the caster assemblies 812 attached to that particular transverse section 832. While the linkage pivot axis is substantially parallel to the longitudinal section 862 and to the longitudinally aligned base pivot axes, it is also consistent with the principles of the present invention for the linkage pivot axis to be non-parallel relative to the longitudinal section 862 and the base pivot axes. Also, while the joint formed between the illustrated intermediate sections 832, 862 permits pivotal movement about the single linkage pivot axis, the principles of the present invention are also applicable where the joint permits relative pivotal movement about more than one linkage pivot axis, e.g., where the joint is a universal joint. Additional preferred details concerning the pivotal interconnection of caster assemblies 812 are disclosed in the incorporated application Ser. No. 10/886,369.

Turning to FIGS. 14-18 and 22, the frame 806 further includes a load-supporting section 878 that is operable to engage and support the load L. The load-supporting section 878 includes two unitary beams 880 that are interconnected by end plates 882 to form a substantially rigid structure. Similar to the longitudinal intermediate section 862, the preferred beams 880 include top and bottom webs 884 and ribs 886 that are preferably welded together. The beams 880 also include attachment ears 888, 890 with holes therethrough.

The end plates 882, the end portions of beams 880, and the attachment ears 888, 890 cooperatively provide shelves 892 for engaging the load L, with each shelf 892 including an upstanding ledge 894 to restrict lateral movement of the load L.

The load-supporting section 878 further includes bushings 896 and detachable shims 898. Each shim 898 includes a catch 900 at one end and an ear 902 at the other end for attaching the shim 898 to the beams 880. When placed in an installed position, the shim 898 extends alongside the upstanding ledge 894 while being secured by engaging the catch 900 with the horizontal plate 882 and by extending a quick-release pin 904 through the shelves 892 (i.e., the holes within ears 888), and a washer 906. When placed in an uninstalled position, the shim 898 extends along the beam 880 by securing the catch 900 to a keeper 908 and by securing the ears 902, 890 with a quick-release pin 910 extending therethrough.

The load-supporting section 878 is pivotally attached to the longitudinal section 862 at an intermediate joint with a fastener 912 including a pin 914 that is received within bushings 896, 916, washers 918 that separate bushings 896, 916, and a locking collar 920. Thus, the sections 862, 878 are pivotal about an intermediate pivot axis, and load-supporting section 878 thereby provides a "walking-beam" suspension to further permit load-sharing among the transverse sections 832 and caster assemblies 812. While the intermediate pivot axis is substantially perpendicular to the linkage pivot axis and parallel to the transversely aligned base pivot axes, it is also consistent with the principles of the present invention for the intermediate pivot axis to be alternatively aligned. Also, while the joint formed between the sections 862, 878 permits pivotal movement about the single intermediate pivot axis, the principles of the present invention are also applicable where the joint permits relative pivotal movement about more than one intermediate pivot axis, e.g., where the joint is a universal joint.

The forklift tubes 804 each include a tube 922 of rectangular cross-section and connection tabs 924 that extend from the sides of the tubes 922. The tubes 922 are preferably sized and positioned so that the forks of a forklift or similar vehicle may be received within the tubes 922. While the illustrated tubes 804 are fixed to the load L (e.g., the tubes 804 are welded to the load L), the principles of the present invention are applicable where the tubes 804 are detachable from the load L (e.g., the tubes 804 simply rest on the respective shelves 892).

As the tubes 804 are received on the load-supporting section 876, the shims 892 are inserted between the tubes 804 and the upright plates 880 to minimize any gap therebetween (if necessary). The connection tabs 918 permit the tubes 804 to be releasably attached to the illustrated carriages 802. In particular, the connection tabs 918 may be received between adjacent ears 886 of the load-supporting section 876 and secured therein by quick-release pin 898. Thus, the tubes 804 and load L may be selectively attached to the carriages 802 to permit the load L to be selectively supported by the carriages 802. Additionally, the attachment of the carriages 802 to the tubes 804 allows a user to conveniently transport the carriages 802 as the load L is being transported with the forklift.

Figure 16:
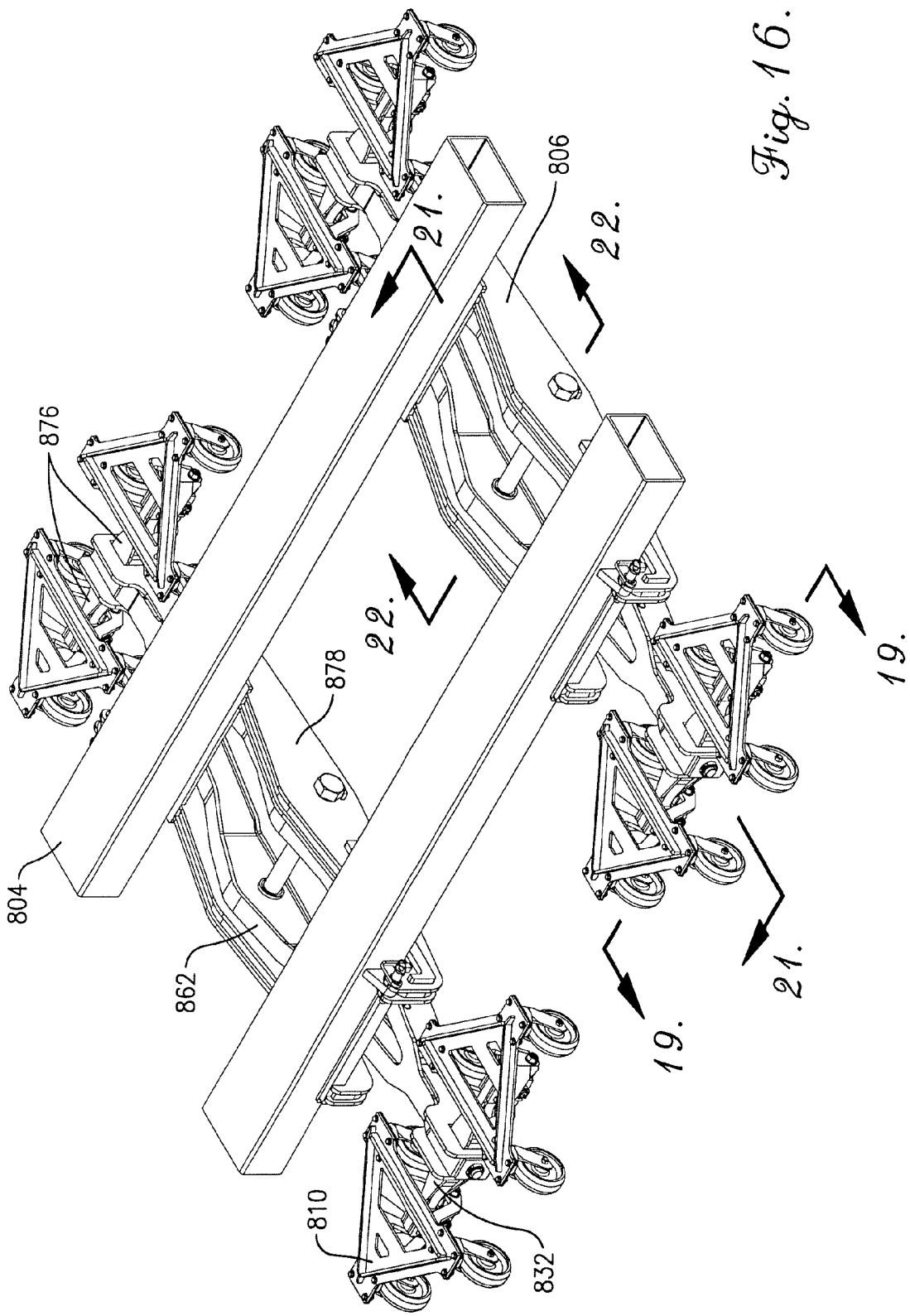
FIG. 16 is an enlarged fragmentary perspective view of the pair of carriages shown in FIGS. 13-15, showing fork lift tubes attached to two of the carriages.
Figure 17:
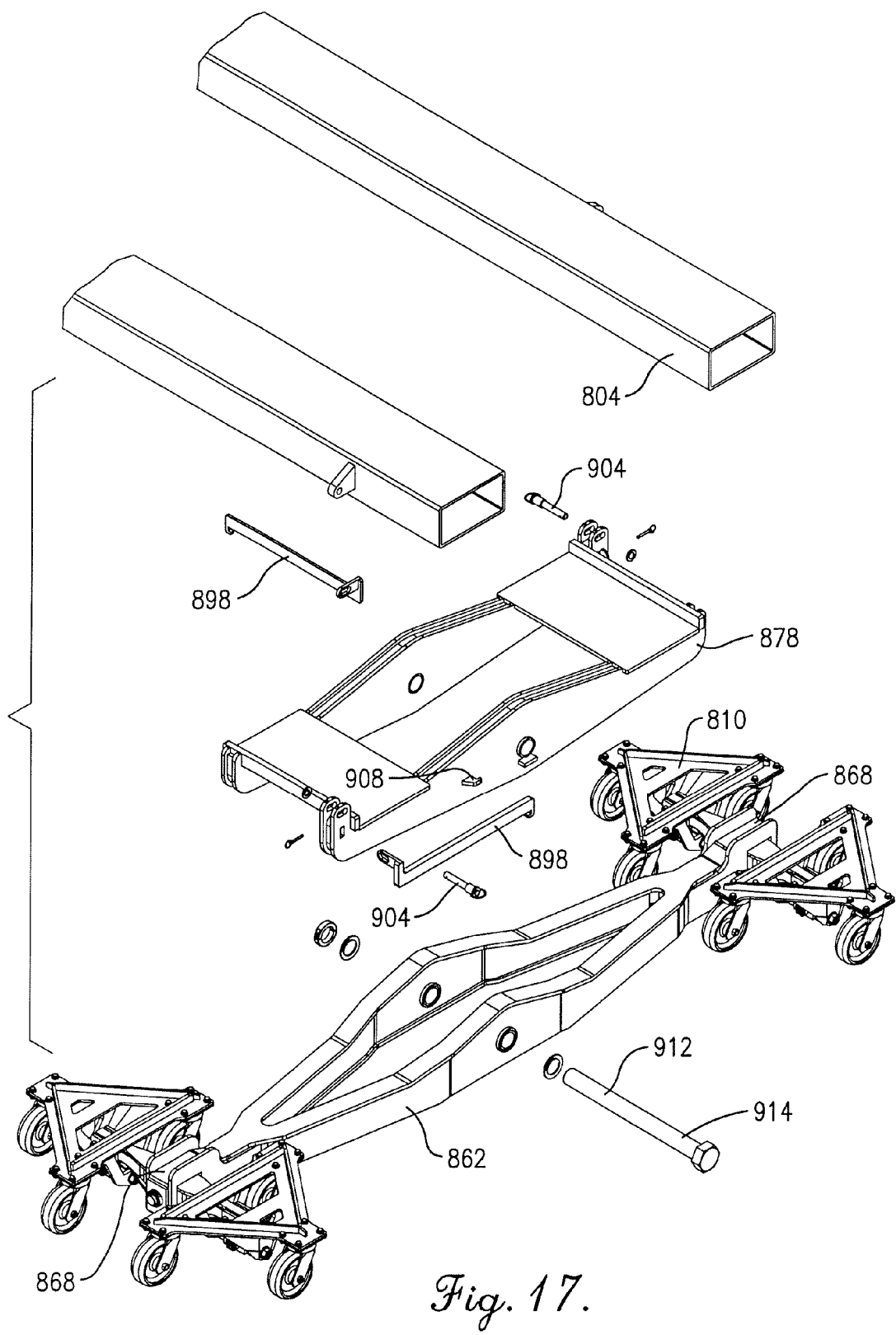
FIG. 17 is an exploded perspective view of one of the carriages shown in FIG. 17.
Figure 18:
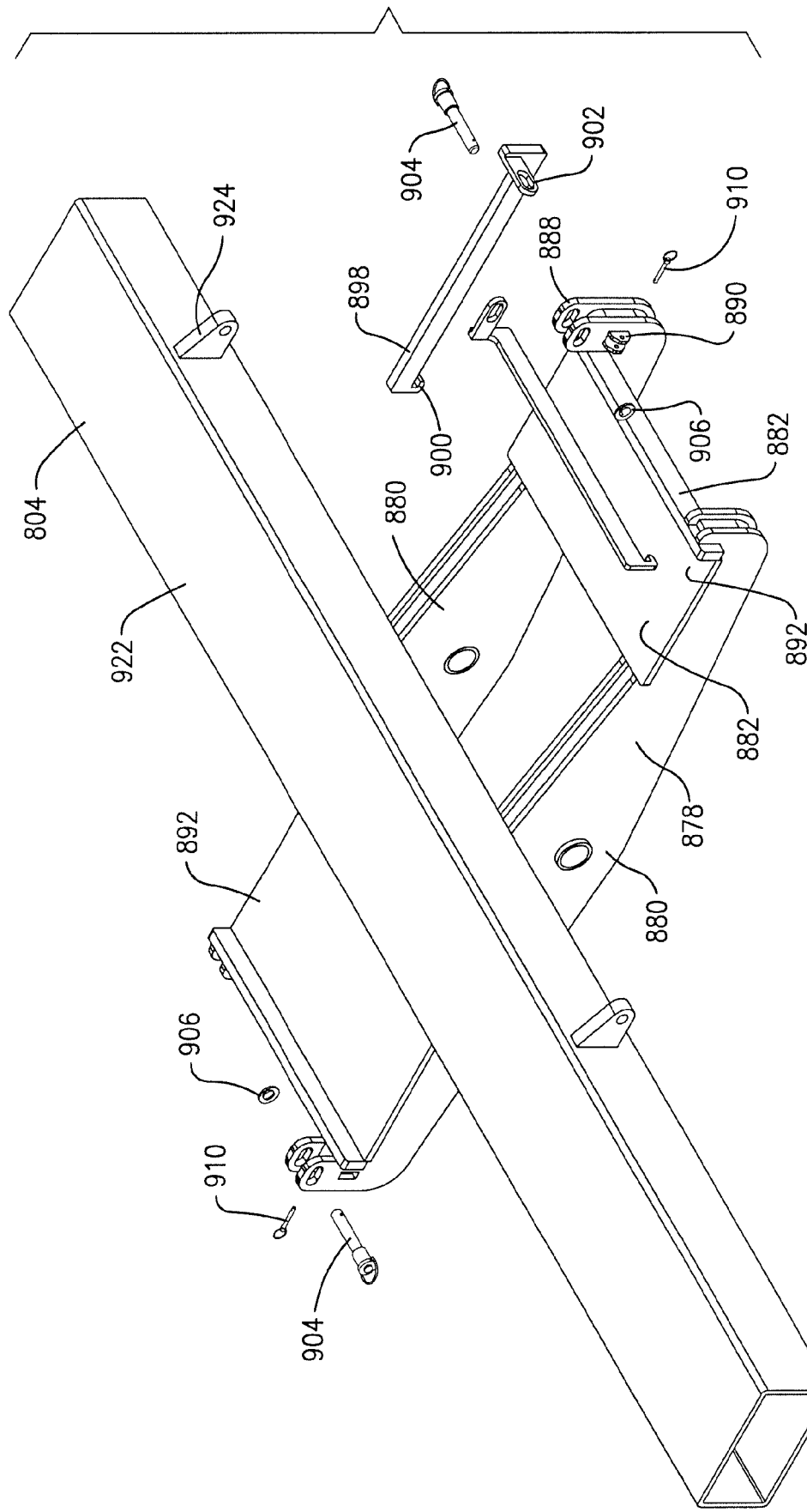
FIG. 18 is a further enlarged exploded perspective view of the assembly shown in FIGS. 12-17.

Turning to FIGS. 16 and 17, the carriage 802 includes various features that enhance stability as it travels over an uneven surface or obstacle. For example, the casters 808 are vertically spaced relative to the base section 810 so that the wheel axes are spaced above the longitudinal and transverse pivotal axes of the block 834 when the surface is substantially level. Also, in the event a substantial tipping force is applied to the carriage 802, the carriage 802 is further stabilized by a shifting fulcrum that is cooperatively provided by the sections 810, 832. In particular, as the transverse section 832 contacts the base section 810 along the opening through which the transverse section 832 extends, the transverse section 832 can cause the caster assembly 812 to move so that one of the casters 808 is not contacting the floor surface. Thus, one or more of the casters 808 remaining in contact with the floor surface provides a new fulcrum about which the carriage 802 pivots. Additional preferred details concerning the stability features of carriage 802 are disclosed in the incorporated applications.

The carriage assembly 800 permits the load L to be supported and moved by multiple carriages 802 while restricting pivotal movement of the load L. Because the load L is customarily rigid and does not articulate, the carriages 802 must pivot relative to one another as uneven surfaces are encountered. Therefore, it is preferable that the linkage between the caster assemblies 812 and the load-supporting section 876 permit the carriages 802 to substantially share the load L while the load-supporting sections 876 maintain a substantially constant position relative to each other. The base pivot axes, linkage pivot axes, and intermediate pivot axis mentioned above allow each carriage 802 to pivot so that the caster assemblies 812 remain in contact with the surface while the positional relationship of the illustrated load-supporting shelves 892 is maintained. In the illustrated embodiment, the respective shelves 892 of each carriage 802 remain aligned in a common plane.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A pair of carriages operable to cooperatively support a rigid load for movement across a surface, wherein the carriages are spaced apart and the load extends therebetween in a spaced direction, each of said carriages comprising:
    at least two caster assemblies, each of which includes a base section and at least three rotatable caster wheels attached to the base section so that the caster assembly is self-supporting;
    a load-supporting section operable to support the load thereon;
    a linkage interconnecting the caster assemblies; and
    at least two pivot couplers, each being pivotally attached to a respective one of the base sections and the linkage to define a pair of base pivot axes associated with the respective caster assembly,
    each of said pivot couplers cooperating with the respective base section and the linkage to restrict relative movement between the respective caster assembly and linkage to pivoting movement about the base pivot axes,
    said linkage being pivotally connected to the load-supporting section about an intermediate pivot axis,
    said load-supporting sections of the carriages having a positional relationship which is maintained substantially constant as the carriages move across the surface.

2. The pair of carriages as claimed in claim 1,
    said spaced direction being perpendicular relative to the intermediate pivot axis so as to restrict pivotal movement of the load about the intermediate pivot axis.

3. The pair of carriages as claimed in claim 2,
    one of said base pivot axes and said intermediate pivot axis of the carriages being substantially parallel.

4. The pair of carriages as claimed in claim 1,
    said caster assemblies including first and second pairs which are interconnected by the linkage.

5. The pair of carriages as claimed in claim 4,
    said first pair of caster assemblies being interconnected by a first linkage portion, and the second pair of caster assemblies being interconnected by a second linkage portion,
    said linkage portions being substantially rigid and pivotally interconnected by a third linkage portion.

6. The pair of carriages as claimed in claim 4,
    said linkage interconnecting three of said caster assemblies.

7. The pair of carriages as claimed in claim 1,
    said linkage and said load-supporting section being pivotal relative to one another about a second intermediate pivot axes, with the second and first-mentioned intermediate pivot axes being perpendicular relative to one another.

8. The pair of carriages as claimed in claim 1,
    said linkage including portions that are pivotally interconnected by a linkage pivot axis.

9. The pair of carriages as claimed in claim 1,
    each of said caster wheels including a wheel axis,
    said base pivot axes being spaced closer to the surface than the respective wheel axes so as to reduce the risk of carriage tipping.

10. The pair of carriages as claimed in claim 1,
    a pair of said caster wheels of each caster assembly being spaced oppositely from one of the respective base pivot axes so that the caster assembly operates as a walking beam.

11. The pair of carriages as claimed in claim 1,
    said base pivot axes associated with each caster assembly being perpendicular relative to one another.

12. The pair of carriages as claimed in claim 11,
    each of said pivot couplers comprising a pivot block pivotally attached to the respective base section about a first one of the base pivot axes and pivotally attached to the linkage about a second one of the base pivot axes.

13. The pair of carriages as claimed in claim 1;
    said intermediate axis being spaced between at least one pair of caster assemblies so that the linkage operates as a walking beam.

14. The pair of carriages as claimed in claim 1,
    said base sections each including an opening that receives the linkage therein,
    said base sections each being operable to contact the linkage along the respective opening in a selected orientation to limit relative pivotal movement therebetween.

15. The pair of carriages as claimed in claim 1,
    said linkage being pivotal relative to one of the base sections in a first direction about the respective one of the base pivot axes,
    said linkage being configured to engage said one of the base sections when said linkage has pivoted into a base-engaging position, wherein further pivoting of the linkage relative to said one of the base sections in the first direction is prevented,
    one of said caster wheels of one of the corresponding caster assemblies being spaced from the respective base pivot axis in the first direction, such that any pivoting of the linkage in the first direction beyond the base-engaging position occurs about said one of said caster wheels.

16. The pair of carriages as claimed in claim 15,
    said linkage contacting said one of the base sections at a contact location when said linkage is pivoted into the base-engaging position,
    said one of said caster wheels being spaced further in the first direction from the respective one of the base pivot axes than the contact location.

17. The pair of carriages as claimed in claim 1,
    said caster wheels being spaced laterally from each other along a direction orthogonal to one of the associated base pivot axes so that the caster wheels are configured to approach a surface obstruction sequentially when the carriage moves along the orthogonal direction.

18. The pair of carriages as claimed in claim 1, said linkage including a longitudinal section and at least a pair of transverse sections,
    each of said transverse sections extending in opposite directions from the longitudinal section to present a pair of opposed outrigger arms, with the transverse section being pivotally coupled to the longitudinal section between the arms for pivotal movement about a longitudinal linkage axis, each of said caster assemblies being pivotally coupled to a corresponding one of the outrigger arms by the associated pivot coupler.

19. A carriage operable to support a load for movement across a surface, said carriage comprising:
a plurality of caster assemblies, each of which includes a base section and at least three rotatable caster wheels attached to the base section so that the caster assembly is self-supporting;
a load-supporting section operable to support the load thereon;
a linkage interconnecting the caster assemblies and load-supporting section,
said linkage including a longitudinal section and at least a pair of transverse sections,
each of said transverse sections extending in opposite directions from the longitudinal section to present a pair of opposed outrigger arms, with the transverse section being pivotally coupled to the longitudinal section between the arms for pivotal movement about a longitudinal axis; and
a plurality of pivot couplers, each being pivotally attached to a respective one of the base sections and a corresponding one of the outrigger arms to define a pair of base pivot axes associated with the respective caster assembly,
each of said pivot couplers cooperating with the respective base section and the corresponding outrigger arm to restrict relative movement between the respective caster assembly and the corresponding outrigger arm to pivoting movement about the base pivot axes.

20. The carriage as claimed in claim 19,
said longitudinal section and said load-supporting section being pivotally interconnected for pivotal movement about a transverse axis.

21. The carriage as claimed in claim 20,
said transverse axis being spaced equally between the transverse sections.

22. The carriage as claimed in claim 21,
said longitudinal section presenting opposite ends,
each of said transverse sections being located adjacent one of the ends.

23. The carriage as claimed in claim 19,
said linkage being pivotally connected to the load-supporting section about a first and second intermediate pivot axes,
said intermediate pivot axes being perpendicular relative to one another.

24. The carriage as claimed in claim 19,
each of said caster wheels including a wheel axis,
said base pivot axes being spaced closer to the surface than the respective wheel axes so as to reduce the risk of carriage tipping.

25. The carriage as claimed in claim 19,
a pair of said caster wheels of each caster assembly being spaced oppositely from one of the respective base pivot axes so that the caster assembly operates as a walking beam.

26. The carriage as claimed in claim 19; and
each of said pivot couplers comprising a pivot block pivotally attached to the respective base section about a first one of the base pivot axes and pivotally attached to the linkage about a second one of the base pivot axes.

27. The carriage as claimed in claim 19;
said linkage being pivotally connected to the load-supporting section about an intermediate pivot axis,
said intermediate pivot axis being spaced between at least one pair of caster assemblies so that the linkage operates as a walking beam.

28. The carriage as claimed in claim 19,
said base sections each including an opening that receives the linkage therein,
said base sections each being operable to contact the linkage along the respective opening in a selected orientation to limit relative pivotal movement therebetween.

29. The carriage as claimed in claim 19,
said linkage being pivotal relative to one of the base sections in a first direction about the respective one of the base pivot axes,
said linkage being configured to engage said one of the base sections when said linkage has pivoted into a base-engaging position, wherein further pivoting of the linkage relative to said one of the base sections in the first direction is prevented,
one of said caster wheels of one of the corresponding caster assemblies being spaced from the respective base pivot axis in the first direction, such that any pivoting of the linkage in the first direction beyond the base-engaging position occurs about said one of said caster wheels.

30. The carriage as claimed in claim 29,
said linkage contacting said one of the base sections at a contact location when said linkage is pivoted into the base-engaging position,
said one of said caster wheels being spaced further in the first direction from the respective one of the base pivot axes than the contact location.

31. The carriage as claimed in claim 19,
said caster wheels being spaced laterally from each other along a direction orthogonal to one of the associated base pivot axes so that the caster wheels are configured to approach a surface obstruction sequentially when the carriage moves along the orthogonal direction.

32. A carriage operable to support a load for movement across a surface, wherein the load is supported at least in part by a forklift tube, which is provided with a connection tab having an aperture defined therein, said carriage comprising:
a caster assembly including a base section and at least three rotatable caster wheels attached to the base section so that the caster assembly is self-supporting;
a load-supporting section operable to support the load thereon;
a linkage interconnecting the caster assembly and load-supporting section; and
a pivot coupler pivotally attached to the base section and the linkage to define a pair of base pivot axes,
said pivot coupler cooperating with the base section and the linkage to restrict relative movement between the caster assembly and linkage to pivoting movement about the base pivot axes,
said load-supporting section including a tube-supporting shelf operable to support the tube thereon,
said shelf presenting a hole dimensioned and configured to align with the aperture when the tube is supported on the shelf; and
a pin configured to be removably received in the aperture and hole when the tube is supported on the shelf so as to releasably secure the load-supporting section to the tube.

33. The carriage as claimed in claim 32,
said shelf presenting an upstanding ledge; and
a shim positionable between the ledge and tube to restrict lateral movement of the tube.

34. The carriage as claimed in claim 33, said shim presenting first and second ends, said shim including a notch adjacent the first end and an opening adjacent the second end, said shim receiving a portion of the plate within the notch when positioned between the ledge and tube, with the opening being in alignment with the hole so that the pin is receivable therein.

35. The carriage as claimed in claim 32, having a plurality of caster assemblies, each of which includes a base section and at least three rotatable caster wheels attached to the base section so that the caster assembly is self-supporting, said linkage including a longitudinal section and at least a pair of transverse sections, each of said transverse sections extending in opposite directions from the longitudinal section to present a pair of opposed outrigger arms, with the transverse section being pivotally coupled to the longitudinal section between the arms for pivotal movement about a longitudinal axis, a plurality of pivot couplers, each being pivotally attached to a respective one of the base sections and the linkage to define a pair of base pivot axes associated with the respective caster assembly, each of said pivot couplers cooperating with the respective base section and the linkage to restrict relative movement between the respective caster assembly and linkage to pivoting movement about the base pivot axes.

* * * * *